(12) United States Patent
Lee et al.

(10) Patent No.: US 10,469,634 B2
(45) Date of Patent: *Nov. 5, 2019

(54) ANTENNA AND ELECTRONIC DEVICE INCLUDING THE SAME

(71) Applicant: Samsung Electronics Co., Ltd., Suwon-si, Gyeonggi-do (KR)

(72) Inventors: Hyung Joo Lee, Seongnam-si (KR); Gyu Sub Kim, Seoul (KR); Dong Yeon Kim, Suwon-si (KR); Chae Up Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,568

(22) Filed: May 29, 2018

(65) Prior Publication Data

US 2018/0278731 A1 Sep. 27, 2018

Related U.S. Application Data

(63) Continuation of application No. 15/673,097, filed on Aug. 9, 2017, now Pat. No. 10,015,294, which is a (Continued)

(30) Foreign Application Priority Data

Aug. 13, 2015 (KR) .................. 10-2015-0114638

(51) Int. Cl.
*H04B 1/44* (2006.01)
*H04M 1/02* (2006.01)
(Continued)

(52) U.S. Cl.
CPC .......... *H04M 1/0202* (2013.01); *H01Q 1/243* (2013.01); *H01Q 1/48* (2013.01);
(Continued)

(58) Field of Classification Search
None
See application file for complete search history.

(56) References Cited

U.S. PATENT DOCUMENTS

| 6,424,300 B1 | 7/2002 | Sanford et al. |
| 7,319,432 B2 | 1/2008 | Andersson |

(Continued)

FOREIGN PATENT DOCUMENTS

| CN | 103346397 A | 10/2013 |
| CN | 104064877 A | 9/2014 |

(Continued)

*Primary Examiner* — Tuan A Tran
(74) *Attorney, Agent, or Firm* — Jefferson IP Law, LLP

(57) ABSTRACT

An electronic device is provided. The electronic device includes a housing including a first surface, a second surface disposed facing an opposite side of the first surface, and a side surface configured to surround at least a portion of a space between the first surface and the second surface, a first elongated metal member configured to form a first portion of the side surface and including a first end and a second end, at least one communication circuit electrically connected to a first point of the first elongated metal member through a capacitive element, at least one ground member disposed in an interior of the housing, and a first conductive member configured to electrically connect a second point of the first elongated metal member to the ground member. The second point of the first elongated metal member is disposed closer to the second end than to the first point.

14 Claims, 42 Drawing Sheets

Related U.S. Application Data continuation of application No. 15/234,547, filed on Aug. 11, 2016, now Pat. No. 9,762,710.

(51) Int. Cl.

| | | |
|---|---|---|
| *H01Q 1/24* | (2006.01) | |
| *H01Q 1/48* | (2006.01) | |
| *H01Q 1/52* | (2006.01) | |
| *H01Q 5/314* | (2015.01) | |
| *H01Q 5/328* | (2015.01) | |
| *H01Q 5/35* | (2015.01) | |
| *H04B 1/3827* | (2015.01) | |
| *H04B 1/48* | (2006.01) | |
| *H04W 84/04* | (2009.01) | |
| *H04W 84/12* | (2009.01) | |
| *H04W 4/80* | (2018.01) | |

(52) U.S. Cl.
CPC ............. *H01Q 1/521* (2013.01); *H01Q 5/314* (2015.01); *H01Q 5/328* (2015.01); *H01Q 5/35* (2015.01); *H04B 1/3833* (2013.01); *H04B 1/48* (2013.01); *H04B 2001/485* (2013.01); *H04W 4/80* (2018.02); *H04W 84/042* (2013.01); *H04W 84/12* (2013.01)

(56) References Cited

U.S. PATENT DOCUMENTS

| | | | |
|---|---|---|---|
| 7,358,906 B2 * | 4/2008 | Sato .................. | H01Q 1/243 |
| | | | 343/700 MS |
| 7,639,194 B2 | 12/2009 | Chi et al. | |
| 8,265,718 B2 | 9/2012 | Horihata et al. | |
| 8,686,297 B2 * | 4/2014 | Shiu .................. | H05K 1/028 |
| | | | 174/250 |
| 8,988,306 B2 * | 3/2015 | Kuo .................. | H01Q 3/24 |
| | | | 343/876 |
| 9,024,823 B2 | 5/2015 | Bevelacqua | |
| 9,065,175 B2 * | 6/2015 | Corbin ............... | H01Q 1/243 |
| 9,153,874 B2 | 10/2015 | Ouyang et al. | |
| 9,431,693 B2 | 8/2016 | Kwak et al. | |
| 9,437,924 B2 * | 9/2016 | Sung ................... | H01Q 1/243 |
| 9,673,507 B2 | 6/2017 | Ramachandran et al. | |
| 9,735,829 B2 | 8/2017 | Cheon et al. | |
| 9,871,286 B2 | 1/2018 | Kang et al. | |
| 9,985,337 B2 | 5/2018 | Kang et al. | |
| 10,056,680 B2 | 8/2018 | Kang et al. | |
| 2005/0270240 A1 | 12/2005 | Qi et al. | |
| 2005/0270241 A1 | 12/2005 | Qi et al. | |
| 2005/0270242 A1 | 12/2005 | Qi et al. | |
| 2006/0208952 A1 | 9/2006 | Qi et al. | |
| 2007/0194994 A1 | 8/2007 | Waltho | |
| 2008/0291100 A1 | 11/2008 | Chi et al. | |
| 2012/0218723 A1 | 8/2012 | Kwak et al. | |
| 2012/0299785 A1 | 11/2012 | Bevelacqua | |
| 2014/0078008 A1 | 3/2014 | Kang et al. | |
| 2014/0111684 A1 | 4/2014 | Corbin et al. | |
| 2014/0125528 A1 | 5/2014 | Tsai et al. | |
| 2014/0266938 A1 | 9/2014 | Ouyang et al. | |
| 2015/0145731 A1 * | 5/2015 | Jhang ................. | H01Q 21/30 |
| | | | 343/702 |
| 2015/0200448 A1 | 7/2015 | Tsai et al. | |
| 2016/0164169 A1 | 6/2016 | Krogerus et al. | |
| 2016/0277062 A1 | 9/2016 | Cheon et al. | |
| 2017/0054200 A1 | 2/2017 | Kang et al. | |
| 2018/0131077 A1 | 5/2018 | Kang et al. | |

FOREIGN PATENT DOCUMENTS

| | | |
|---|---|---|
| CN | 104659483 A | 5/2015 |
| CN | 104810622 A | 7/2015 |
| EP | 1752004 B1 | 12/2010 |
| EP | 2 528 165 A1 | 11/2012 |
| GB | 2516304 A | 1/2015 |
| KR | 10-2008-0112502 A | 12/2008 |

* cited by examiner

ANTENNA AND ELECTRONIC DEVICE INCLUDING THE SAME

CROSS-REFERENCE TO RELATED APPLICATION(S)

This application is a continuation application of prior application Ser. No. 15/673,097, filed Aug. 9, 2017, which is a continuation application of prior application Ser. No. 15/234,547, filed on Aug. 11, 2016, which has been issued as U.S. Pat. No. 9,762,710 on Sep. 12, 2017 and was based on and claimed priority under 35 U.S.C. § 119(a) of a Korean patent application filed on Aug. 13, 2015 in the Korean Intellectual Property Office and assigned Serial number 10-2015-0114638, the entire disclosure of which is hereby incorporated by reference.

TECHNICAL FIELD

The present disclosure relates to an electronic device including an antenna.

BACKGROUND

Due to the recent development of the information/communication technology, network devices such as base stations are installed everywhere, and an electronic device may allow the user to freely use networks everywhere, by transmitting and receiving data to and from another device through the networks.

An antenna is necessary to use the networks. With the development of the information/communication technology, the antenna technology also has developed, and in recent years, studies for efficiently securing an arrangement space for an antenna of elements of an electronic device, which is provided for communication, and preventing lowering of radiation performance of the antenna in advance have been made.

The antenna used in the electronic device may include an inverted-F antenna (IFA) or a monopole radiator as a basic structure, and the volumes and the number of mounted antenna radiators may be changed according to the frequencies to be serviced, the bandwidth, and the type of the antenna. For example, frequencies may be different for regions, but generally, a low band of about 700 MHz to about 990 MHz, a mid band of about 1700 MHz to about 2100 MHz, and a high band of about 2300 MHz to about 2700 MHz may be used as main communication bands. Further, various communication services such as BLUETOOTH (BT), Global Positioning System (GPS), or Wi-Fi are being used, but is it difficult to design one antenna that supports all the aforementioned communication bands in a limited volume of the electronic device.

Meanwhile, in a European product, it is necessary for an antenna to support at least 24 bands such as 2nd generation (2G) (Global System for Mobile Communications (GSM) 850 MHz (GSM850), extended GSM (EGSM), Digital Cellular System (DCS), and Personal Communications Service (PCS)), Wideband Code Division Multiple Access (WCDMA) (B1, B2, B5, and B8) and long term evolution (LTE) (B1, B2, B3, B4, B5, B7, B8, B12, B17, B18, B19, B20, B26, B38, B39, B40, and B41). Because it is difficult to satisfy specifications required by the communication businesses and also satisfy specific absorption rate (SAR) standards while realizing the bands with one antenna, at least two service bands having close frequency bands may be combined to implement an antenna. For example, it may be designed such that one antenna supports 2G (GSM850, EGSM, DCS, and PCS), WCDMA (B1, B2, B5, and B8) and LTE (B1, B2, B3, B4, B5, B8, B12, B17, B18, B19, B20, B26, and B39) and another antenna supports LTE (B7, B38, B40, and B41).

Generally, in order that two antennas may be operated in different bands, the two antennas should be designed such that electric power is fed to the antennas by using different radio frequency (RF) ports (feeders) and a specific isolation or more is secured between the two antennas to minimize mutual influence.

For example, one antenna may be disposed at the left end of the electronic device, and another antenna may be disposed at the right end of the electronic device. In this case, if it is designed such that different antennas support a low band (for example, B20, B8, B17, or the like), it is difficult to secure an isolation of $\lambda/4$ or more that is a minimum distance by which an isolation may be secured, when it is considered that the width of a general electronic device (for example, a smartphone) is about 70 mm to 80 mm ($\lambda/4$ of a low band (for example, 900 MHz is about 80 mm) Meanwhile, because a low band may be secured by a switching technology, one antenna is implemented by a penta-band antenna that supports a low band, and another antenna may be implemented by an antenna that supports a high band such as LTE B7, B38, B40, or B41. However, in this case, because the length of the antenna is short, the performance of the antenna may be lowered by an influence of the human body when the electronic device is gripped by a hand of the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an antenna that may secure an excellent performance and efficiently secure a mounting space, and an electronic device including the same.

Another aspect of the present disclosure is to provide a so-called coupled feeding antenna that connects a metal housing and a feeder with a capacitive element.

Another aspect of the present disclosure is to provide an electronic device that, in order to secure an isolation between a first antenna and a second antenna that uses at least a portion of a metal housing included in the electronic device, uses two spaced ground parts as a ground part for the first antenna and a ground part for the second antenna, respectively.

Meanwhile, the technical aspects that are to be accomplished by various embodiments of the present disclosure are not limited to the aforementioned ones, and other technical aspects may be present.

In accordance with an aspect of the present disclosure, an electronic device is provided. The electronic device includes a housing including a first surface, a second surface disposed facing an opposite side of the first surface, and a side surface configured to surround at least a portion of a space between the first surface and the second surface, a first elongated metal member configured to form a first portion of the side surface and including a first end and a second end, at least one communication circuit electrically connected to a first point of the first elongated metal member through a capacitive element, at least one ground member disposed in an interior of the housing, and a first conductive member configured to electrically connect a second point of the first elongated metal member to the ground member. The second point of the first elongated metal member is disposed closer to the second end than to the first point of the first elongated metal member.

In accordance with another aspect of the present disclosure, an electronic device is provided. The electronic device includes a housing including a first surface, a second surface disposed facing an opposite side of the first surface, and a side surface configured to surround at least a portion of a space between the first surface and the second surface, a first elongated metal member configured to form a first portion of the side surface and including a first end and a second end, at least one communication circuit electrically connected to a first point of the first elongated metal member, at least one ground member disposed in an interior of the housing, a first conductive member configured to electrically connect a second point of the first elongated metal member to the ground member, and a second conductive member configured to electrically connect a third point of the first elongated metal member to the ground member. The second point of the first elongated metal member is disposed closer to the second end than to the first point of the first elongated metal member. The third point of the first elongated metal member is disposed closer to the second end than to the second point of the first elongated metal member.

In accordance with another aspect of the present disclosure, an electronic device is provided. The electronic device includes a housing including a first surface, a second surface disposed facing an opposite side of the first surface, and a side surface configured to surround at least a portion of a space between the first surface and the second surface, a first elongated metal member configured to form a first portion of the side surface and including a first end and a second end, at least one communication circuit electrically connected to a first point of the first elongated metal member, at least one ground member disposed in an interior of the housing, and a conductive sheet configured to electrically connect a portion of the first elongated metal member to the ground member through an area contact. The portion of the first elongated metal member is disposed closer to the second end than to the first point of the first elongated metal member.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
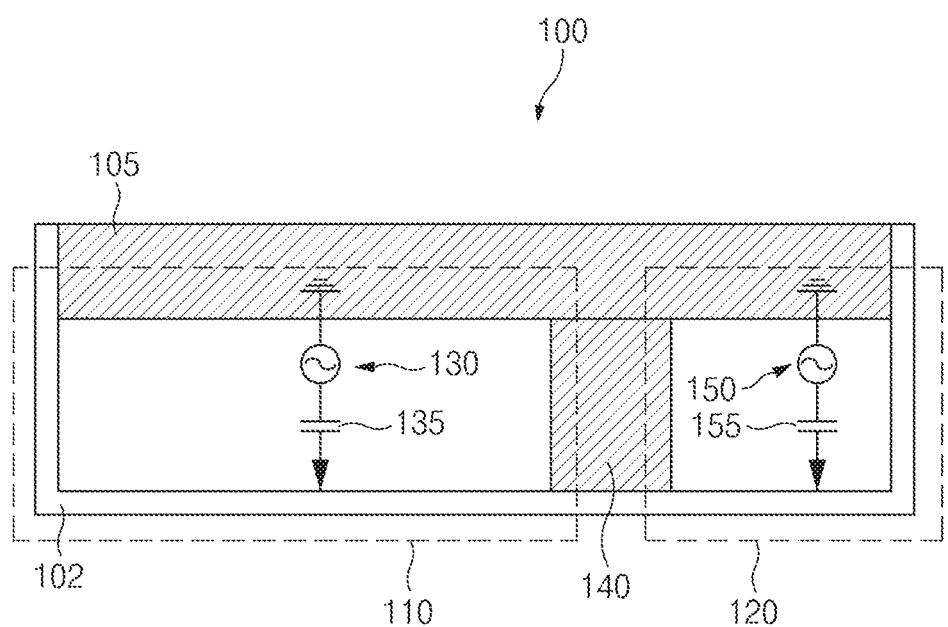
FIG. 1 is a view illustrating an antenna including a ground patch according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure disclosed herein, the expressions "have," "may have," "include," and "comprise," or "may include" and "may comprise," used herein indicate existence of corresponding features (for example, elements such as numeric values, functions, operations, or components) but do not exclude presence of additional features.

In various embodiments of the disclosure, the expressions "A or B," "at least one of A or/and B," or "one or more of A or/and B," and the like used herein may include any and all combinations of one or more of the associated listed items. For example, the term "A or B," "at least one of A and B," or "at least one of A or B," may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, such terms do not limit the order and/or priority of the elements. The expressions may be used to distinguish one element from another element. For example, a first user device and a second user device may represent different user devices irrespective of sequence or importance. For example, without departing the scope of various embodiments of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element) in various embodiments of the present disclosure, it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used in various embodiments of the present disclosure may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (for example, an embedded processor) for performing a corresponding operation or a generic-purpose processor (for example, a central processing unit (CPU) or an application processor (AP) which may perform corresponding operations by executing one or more software programs which are stored in a memory device.

Terms used in various embodiments of the present disclosure are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Although described below through FIGS. 1 to 4, 5A to 5C, 6 to 8, 9A to 9F, 10, 11A to 11F, 12A to 12B, 13A to 13B, 14A to 14B, 15, 16, 17A to 17B, 18, 19, 20A to 20D, 21 to 27, electronic devices according to various embodiments of the present disclosure may be electronic devices that use an antenna having a metal housing as a part of the antenna. For example, an electronic device may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer III (MP3) players, mobile medical devices, cameras, wearable devices (for example, head-mounted-devices (HMDs), such as electronic glasses), an electronic apparel, electronic bracelets, electronic necklaces, electronic appcessories, electronic tattoos, smart mirrors, smart bands, smart watches, and the like.

In various embodiments of the present disclosure, the electronic device may be a smart home appliance that uses the antenna having a metal housing as a part of the antenna. The smart home appliances may include, for example, at least one of a digital versatile disc (DVD) player, an audio, a refrigerator, an air conditioner, a cleaner, an oven, a microwave oven, a washing machine, an air cleaner, a set-top box, a home automation control panel, a security control panel, a TV box (for example, Samsung Home-Sync™, Apple TV™, or Google TV™), a game console (for example, Xbox™ or PlayStation™), an electronic dictionary, an electronic key, a camcorder, or an electronic panel.

In various embodiments of the present disclosure, the electronic device may be a flexible electronic device that uses the antenna having a metal housing as a part of the antenna.

Further, the electronic device according to various embodiments of the present disclosure is not limited to the aforementioned devices, but may include new electronic devices produced due to the development of technologies.

Hereinafter, an antenna and an electronic device that uses the antenna according to various embodiments will be described with reference to the accompanying drawings. The term "user" used in various embodiments may refer to a person who uses an electronic device or may refer to a device (for example, an artificial electronic device) that uses an electronic device.

An electronic device according to various embodiments of the present disclosure may include at least one antenna. The antenna is provided for communications with the outside, and the shape, the length, the ground location, and the feeding location of the antenna may be designed such that the antenna performs communications at a desired frequency band.

According to various embodiments of the present disclosure, the antenna may include a ground connector that connects a radiator and a ground part, and the ground connector may be of a line type or a patch type.

A ground connector of a patch type (hereinafter, a ground patch) may physically connect a metal housing and a ground part (for example, a ground part of a PCB) of an electronic device, and may be a conductor that surface-to-surface connects the metal housing and the ground part. Further, a ground connector of a line type (hereinafter, a ground line) may be a conductor that electrically point-to-point connects a metal housing and a ground part of an electronic device that is used as a radiator of an antenna.

For example, the ground patch or ground line may be integrally formed with the ground part. Alternatively, the ground patch or ground line may be integrally formed with a housing having a metal external appearance. This may be different according to a mechanical strength condition.

Figure 2:
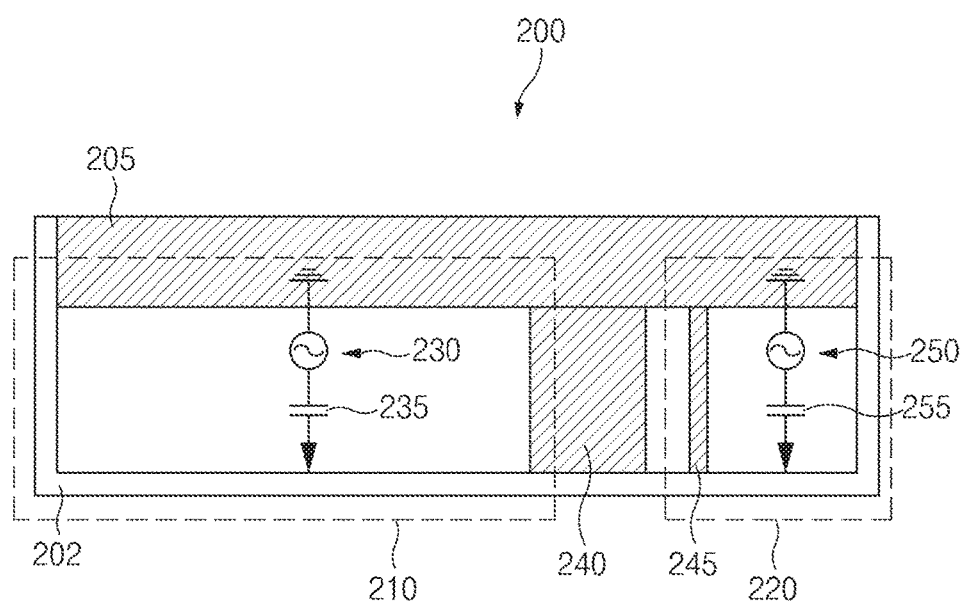
FIG. 2 is a view illustrating an antenna including a ground patch or a ground line according to various embodiments of the present disclosure.
Figure 3:
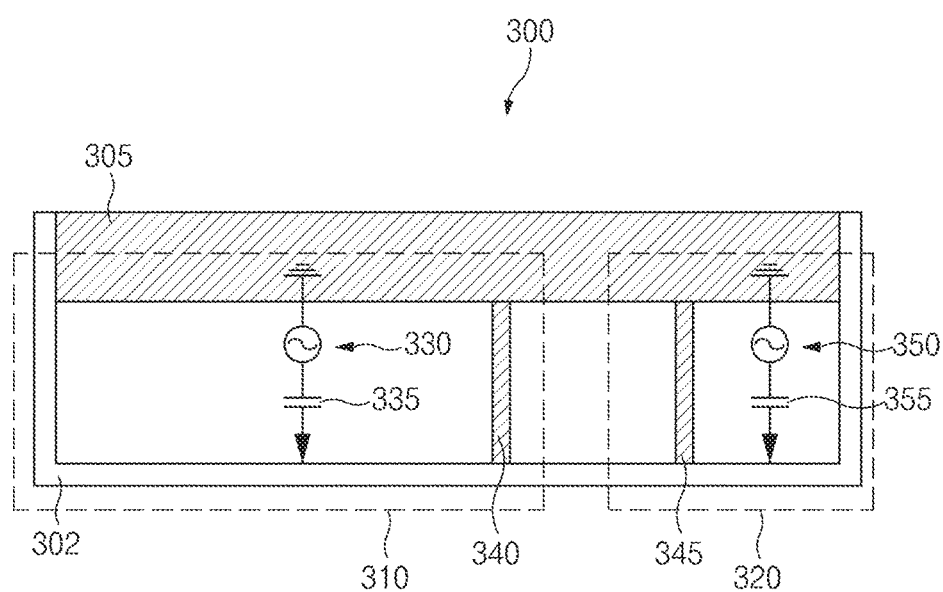
FIG. 3 is a view illustrating an antenna including a plurality of ground lines according to various embodiments of the present disclosure.

According to various embodiments of the present disclosure, the antenna may use only one of the ground patch and ground line, or may use both the ground patch and the ground line. Hereinafter, FIGS. 1 to 3 are views illustrating various embodiments of the present disclosure in which an antenna uses a ground patch and/or a ground line.

FIG. 1 is a view illustrating an antenna including a ground patch according to various embodiments of the present disclosure.

Referring to FIG. 1, FIG. 1 illustrates an area of a lower end of the electronic device 100, which may include an elongated metal member 102, a ground part 105, a first antenna 110, and a second antenna 120.

An area of FIG. 1 enclosed by the left dotted line represents a first antenna 110, and an area of FIG. 1 enclosed by the right dotted line represents a second antenna 120. The first antenna 110 may include at least a portion of the metal member 102, at least a portion of the ground part 105, a feeder 130, a capacitive element 135, and a ground patch 140. At least a portion of the metal member 102 may be a radiator of the first antenna 110. The ground patch 140 may electrically connect the ground part 105 and the radiator of the first antenna 110. The second antenna 120 may include at least a portion of the metal member 102, at least a portion of the ground part 105, a feeder 150, a capacitive element 155, and a ground patch 140. At least a portion of the metal member 102 may be a radiator of the second antenna 120. The ground patch 140 may electrically connect the ground part 105 and the radiator of the second antenna 120. For example, the first antenna 110 and the second antenna 120 may be connected to the ground part 105 through at least a portion of the ground patch 140.

According to an embodiment, the metal member may be a metal housing of the electronic device 100. Meanwhile, the metal members mentioned in FIGS. 1 to 4, 5A to 5C, 6 to 8, 9A to 9F, 10, 11A to 11F, 12A to 12B, 13A to 13B, 14A to 14B, 15, 16, 17A to 17B, 18, 19, 20A to 20D, 21 to 27, and 28A to 28C are not limited to a metal housing, and the metal member may be a conductive material located in the interior of the housing of the electronic device 100, a conductive material mounted on a printed circuit, or a metallic socket.

According to an embodiment, the first antenna 110 and the second antenna 120 provided in the electronic device 100 may be operated as individual antenna due to the ground patch 140. The left side surface of the ground patch 140 may perform a ground function for the first antenna, and the right side surface of the ground patch 140 may perform a ground function for the second antenna 120. Accordingly, the first antenna 110 and the second antenna 120 may be isolated from each other such that the performances of the first antenna 110 and the second antenna 120 may not be mutually influenced.

According to various embodiments of the present disclosure, the width of the ground patch 140 may be changed according to the size of a metal component, which is to be mounted on the corresponding area. For example, the width of the ground patch 140 may be larger than the physical width of a port (not illustrated), for example, a micro universal serial bus (USB) port or an earphone jack, for peripheral devices. In this case, as a port for peripheral devices, which is to be mounted on the ground patch 140, is located at a low electric potential, an Influence on the antenna by the port may decrease. Further, if a plug is inserted into the port for peripheral devices, a capacitive load and a dielectric loss, which occur in an antenna, may be influenced. However, because the plug is inserted into a site having a low electric potential if the port for peripheral devices are mounted on the ground patch, the influence may decrease.

According to an embodiment, the ground patch 140 may form an electrical length of the radiator of the first antenna 110, and may form an electrical length of the radiator of the second antenna 120. According to an embodiment, the ground patch 140 also may act as the radiator of the first antenna 110 and the radiator of the second antenna 120.

Although FIG. 1 illustrates that a capacitive element 135 and a capacitive element 155 are connected to a feeder 130 and a feeder 150, respectively, according to various embodiments of the present disclosure, the feeder 130 and the feeder 150 may be directly connected to the radiator of the first antenna 110 and the radiator of the second antenna 120 without using the capacitive element 135 and the capacitive element 155.

FIG. 2 is a view illustrating an antenna including a ground patch or a ground line according to various embodiments of the present disclosure.

Referring to FIG. 2, a first antenna 210 and a second antenna 220 of FIG. 2 correspond to the first antenna 110 and the second antenna 120 of FIG. 1, respectively, a repeated description will be omitted. Metal member 202, feeder 230, capacitive element 235, feeder 250, and capacitive element 255 of electronic device 200 correspond to the similarly named elements of FIG. 1, and a description thereof will not be repeated.

Referring further to FIG. 2, a radiator of the first antenna 210 may be connected to a ground part 205 through at least a portion of the ground patch 240. Further, a radiator of the second antenna 220 may be connected to the ground part 205 through a ground line 245.

The port for peripheral devices, which has been described with reference to FIG. 1, may be located on or over the ground patch 240, and may be located between the ground patch 240 and the ground line 245. Further, a portion of the port for peripheral devices may be located on or over the ground patch 240, and the remaining portions thereof may be located between the ground patch 240 and the ground line 245.

FIG. 3 is a view illustrating an antenna including a plurality of ground lines according to various embodiments of the present disclosure.

Referring to FIG. 3, a first antenna 310 and a second antenna 320 of FIG. 3 correspond to the first antenna 110 and the second antenna 120 of FIG. 1 or the first antenna 210 and the second antenna 220 of FIG. 2 respectively, and a repeated description thereof will be omitted. Metal member 302, feeder 330, capacitive element 335, feeder 350, and capacitive element 355 of electronic device 300 correspond to the similarly named elements of FIG. 1 and FIG. 2, and a description thereof will not be repeated Referring to FIG. 3, the first antenna 310 and the second antenna 320 may be connected to a ground part 305 through a first ground line 340 and a second ground line 345, respectively.

According to an embodiment, the port for peripheral devices, which has been described with reference to FIGS. 1 and 2, may be located between the first ground line 340 and the second ground line 345. For example, when the electronic device includes two or more ground lines, an internal module may be present between the ground lines and the internal module may be a part that may be connected to the outside. When the internal module is, for example, an earphone jack, a change in the electrical length of the first antenna 310 or the second antenna 320 due to insertion of an earphone plug may deteriorate the performance of the antenna, but the influence may be decreased by disposing the earphone jack between the first ground line 340 and the second ground line 345. Further, when an interference of wires of another configuration, such as a micro universal serial bus (USB) module, a speaker, or a microphone, which is disposed adjacent to the antenna is present, an influence on the antenna may be decreased by providing the micro USB module, the speaker, or the microphone between the first ground line 340 and the second ground line 345. The above description may be applied to the cases of FIGS. 1 and 2 in the same way.

Figure 4:
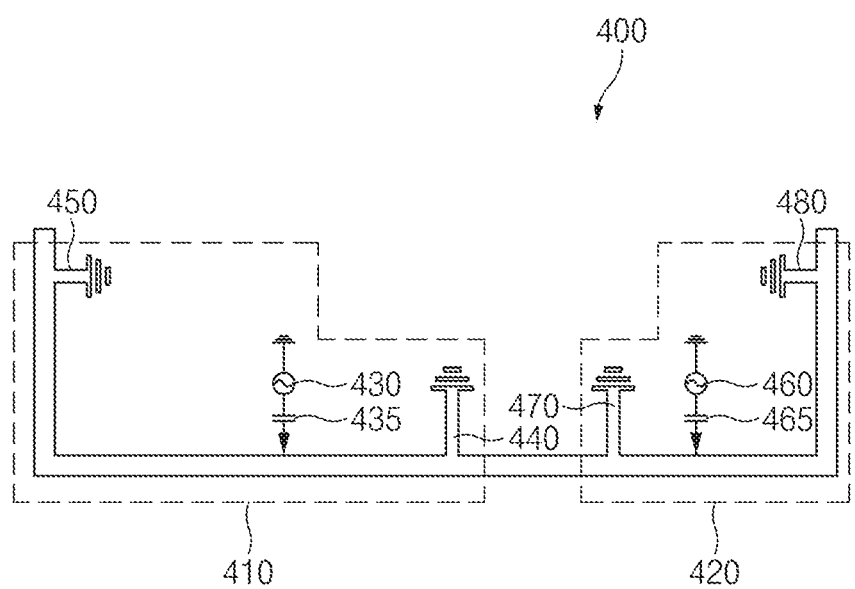
FIG. 4 is a view illustrating a multiband antenna including a ground line according to various embodiments of the present disclosure.

FIG. 4 is a view illustrating a multiband antenna including a ground line according to various embodiments of the present disclosure.

Referring to FIG. 4, the electronic device 400 may include a first antenna 410 and a second antenna 420. The first antenna 410 may include a portion of an elongated metal member of the electronic device 400 as a radiator, and may include a feeder 430, a first ground part 440, and a second ground part 450. Similarly, the second antenna 420 may include a portion of an elongated metal member of the electronic device 400 as a radiator, and may include a feeder 460, a first ground part 470, and a second ground part 480.

The first ground part 440 and the second ground part 450 of the first antenna 410 and the first ground part 470 and the second ground part 480 of the second antenna 420 of FIG. 4 may be formed by coupling the ground lines and the ground parts, which have been described with reference to FIGS. 1 to 3.

The first antenna 410 may be connected to two ground parts (for example, the first ground part 440 and the second ground part 450) through different paths, and may act as a multiband antenna. Similarly, the second antenna 420 may be connected to two ground parts (for example, the first ground part 470 and the second ground part 480) through different paths, and may act as a multiband antenna.

Further, according to an embodiment, the first antenna 410 may perform communications at different frequency bands according to the length of a ground line included in the first ground part 440 or the second ground part 450 of the first antenna 410. Similarly, the second antenna 420 may perform communications at different frequency bands according to the length of a ground line included in the first ground part 470 or the second ground part 480 of the second antenna 420. According to an embodiment, the length of the ground line of the ground part may be designed such that communications may be performed at an intended frequency band by using the first antenna 410 or the second antenna 420.

According to an embodiment, the first antenna 410 may perform communications at different frequency bands according to the electrical length from the feeder 430 of the first antenna 410 to the ground part 440 or the ground part 450. Similarly, the second antenna 420 may perform communications at different frequency bands according to the electrical length from the feeder 460 of the second antenna 420 to the ground part 470 or the ground part 480. According to an embodiment, the location of a feeding point of the feeder 430 or the location of a feeding point of the feeder 460 may be designed such that communications may be performed at an intended frequency band by using the first antenna 410 or the second antenna 420.

According to an embodiment, the first antenna 410 and the second antenna 420 may have different resonance frequencies according to the capacitances of capacitive elements 435 and 465 connected to the feeder 430 of the first antenna 410 and the feeder 460 of the second antenna 420. Detailed contents will be described below with reference to FIGS. 5A to 5C.

Figure 5A:
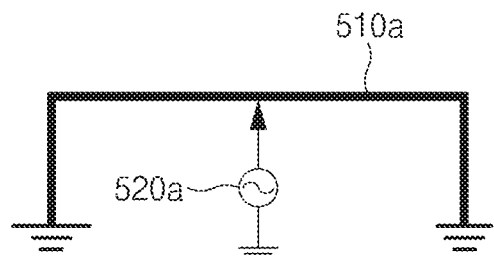
FIG. 5A is a view illustrating an antenna using direct feeding according to various embodiments of the present disclosure.

FIG. 5A is a view illustrating an antenna using direct feeding according to various embodiments of the present disclosure. FIG. 5A is a view illustrating an antenna using coupled feeding according to various embodiments of the present disclosure.

Referring to FIG. 5A, opposite ends of a radiator 510*a* of the antenna may be grounded, and a feeder 520*a* may be connected to an intermediate point of a radiator 510*a* of the antenna. Further, referring to FIG. 5B, opposite ends of a radiator 510*b* of the antenna may be grounded, and a feeder 520*b* may be connected to an intermediate point of a radiator 510*b* of the antenna. When FIG. 5B is compared with FIG. 5A, a capacitive element 530 may be included in the feeder 520*b*.

Figure 5B:
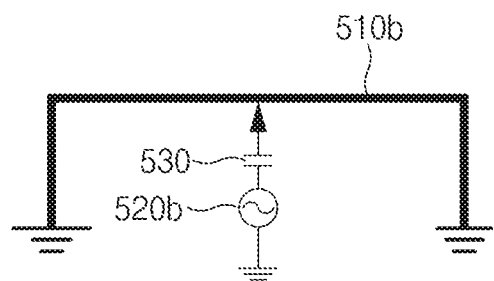
FIG. 5B is a view illustrating an antenna using coupled feeding according to various embodiments of the present disclosure.

According to an embodiment, in the antenna of FIG. 5B, a capacitive element 530 that is a lumped element separate from a matching circuit may be inserted between the radiator 510*b* and the feeder 520*b*, and electric power may be fed through the capacitive element 530. Hereinafter, the structure will be defined as a coupled feeding antenna structure. The coupled feeding antenna structure may be a structure in which a capacitive element that is a lumped element is connected for a coupling effect due to a spatial restriction in the electronic device, instead of inducing mutual coupling by disposing antenna patterns adjacent to each other.

It will be assumed that the radiator of FIG. 5A and the radiator of FIG. 5B have the same length.

Figure 5C:
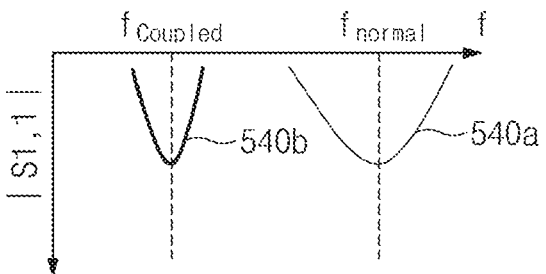
FIG. 5C is a graph illustrating reflection coefficients according to the frequencies of the antennas of FIGS. 5A and 5B according to various embodiments of the present disclosure.

FIG. 5C is a graph illustrating reflection coefficients according to the frequencies of the antennas of FIGS. 5A and 5B according to various embodiments of the present disclosure.

FIG. 5C illustrates an antenna characteristic graph 540*a* of an antenna that receives a signal from the direct-fed feeder 520*a* of FIG. 5A, and an antenna characteristic graph 540*b* of an antenna that receives a signal from the coupled-fed feeder 520*b* of FIG. 5B. When the antenna characteristic graph 540*a* and the antenna characteristic graph 540*b* are compared with each other, it can be seen that a resonance frequency of the antenna characteristic graph 540*b* is lower than a resonance frequency of the antenna characteristic graph 540*a*. For example, an antenna that receives a signal from the coupled-fed feeder 520*b* may be impedance-matched at a low frequency band as compared with an antenna that receives a signal from the direct-fed feeder 520*a*. This may be because the electrical length of the feeder 520*b* as a radiator becomes larger than the electrical length of the feeder 520*a* due to the capacitive element 530.

Figure 6:
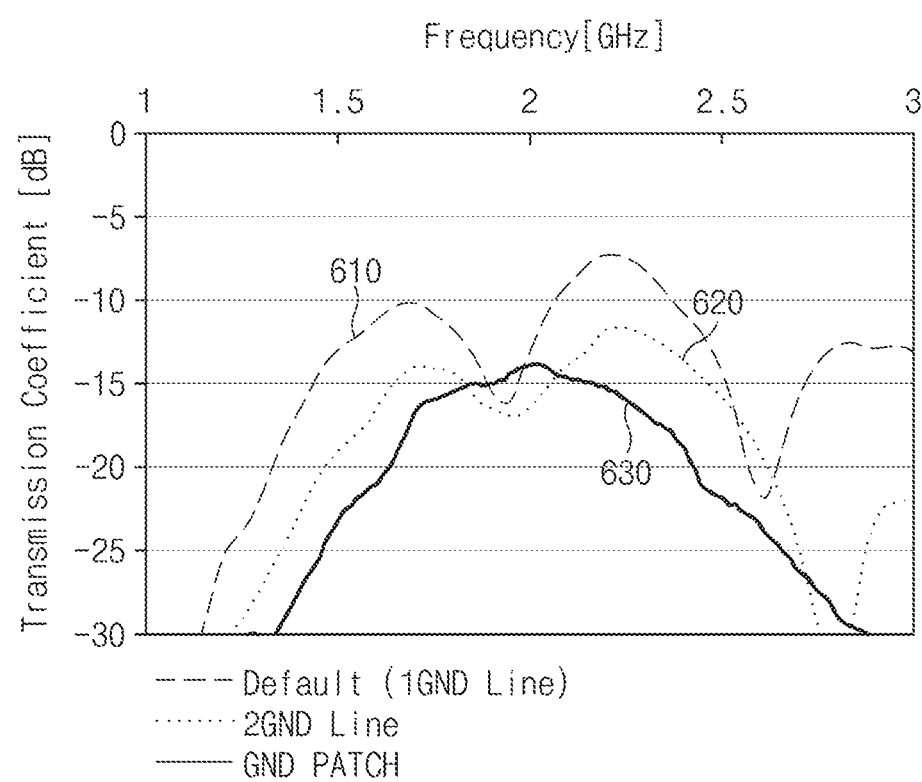
FIG. 6 is a graph illustrating transmission coefficients according to the frequencies of antennas when one ground line is used, when two ground line is used, and one ground patch is used, respectively, according to various embodiments of the present disclosure.

FIG. 6 is a graph illustrating transmission coefficients according to the frequencies of antennas when one ground line is used, when two ground lines are used, and one ground patch is used, respectively according to various embodiments of the present disclosure.

Referring to FIG. 6, an antenna characteristic graph 610 is a graph corresponding to the case in which one ground line is used, an antenna characteristic graph 620 is a graph corresponding to the case in which two ground lines are used, and an antenna characteristic graph 630 is a graph corresponding to the case in which one ground patch is used.

The Y axis of the graph represents transmission coefficient in unit of dB, and the transmission coefficient may correspond to a S21 value of an S-parameter. In antenna characteristics, the value of the transmission coefficient becomes more excellent as it becomes lower.

For example, the antenna characteristic graphs 610 to 630 are compared, the antenna characteristic are more excellent when two ground lines are used than when one ground line is used, and are more excellent when one ground patch is used than when two ground lines are used.

Figure 7:
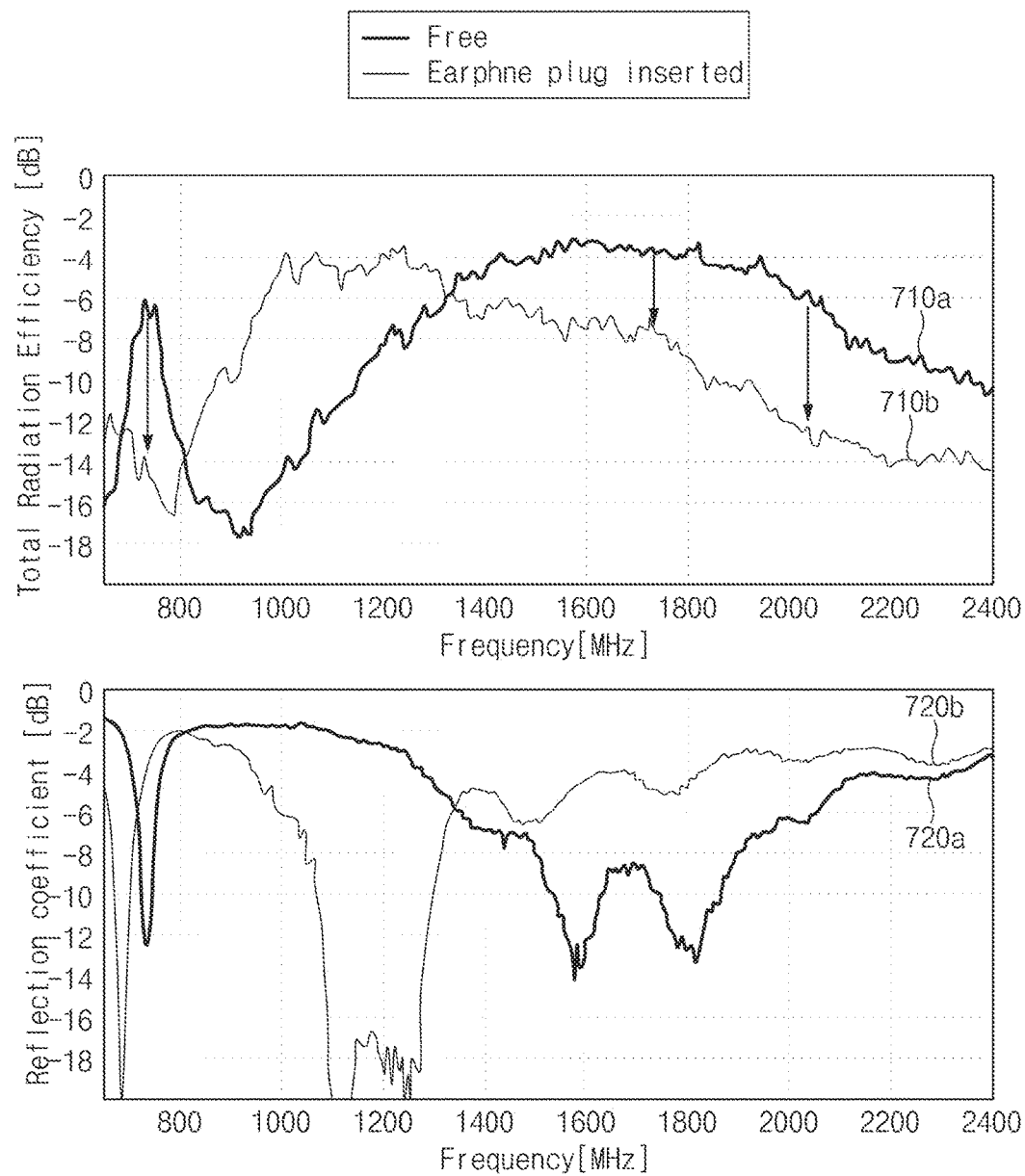
FIG. 7 is a graph illustrating characteristics of an antenna that uses one ground line in the case in which an earphone plug is inserted into an earphone jack and characteristics of the antenna in the case in which the earphone plug is not inserted according to various embodiments of the present disclosure.

FIG. 7 is a graph illustrating characteristics of an antenna that uses one ground line in the case in which an earphone plug is inserted into an earphone jack and characteristics of the antenna in the case in which the earphone plug is not inserted according to various embodiments of the present disclosure.

Referring to FIG. 7, the drawing illustrated at the upper side of FIG. 7 is a graph representing radiation efficiency as antenna characteristics in unit of dB, and the drawing illustrated at the lower side of FIG. 7 is a graph representing reflection coefficient as antenna characteristics in unit of dB.

In the drawing illustrated at the upper side of FIG. 7, the graph 710*a* is a graph corresponding to the case in which the earphone plug is not inserted into the earphone jack. The graph 710*b* is a graph corresponding to the case in which the earphone plug is inserted into the earphone jack. In the drawing illustrated at the lower side of FIG. 7, the graph 720*a* is a graph corresponding to the case in which the earphone plug is not inserted into the earphone jack. The graph 720*b* is a graph corresponding to the case in which the earphone plug is inserted into the earphone jack.

When the graph 710*a*, the graph 710*b*, the graph 720*a*, and the graph 720*b* are compared, it can be seen that the antenna characteristics are greatly changed according to insertion of the earphone plug.

Hereinafter, the antenna characteristics according to insertion of the earphone plug when the earphone jack is disposed on or over the ground patch, or the earphone jack is disposed between the two ground lines will be described with reference to FIG. 8.

Figure 8:
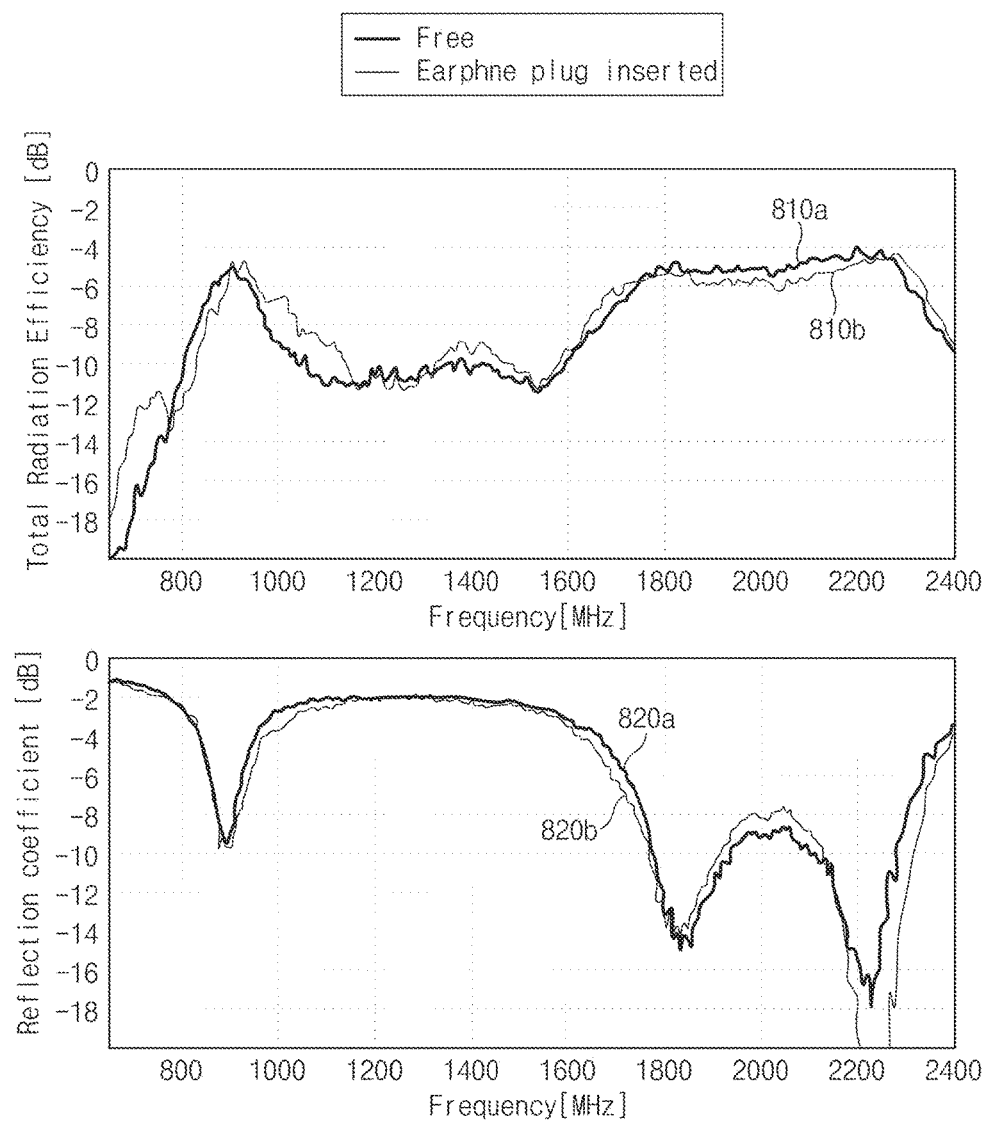
FIG. 8 is a graph illustrating characteristics of an antenna that uses two ground lines or one ground patch in the case in which an earphone plug is inserted into an earphone jack and characteristics of the antenna in the case in which the earphone plug is not inserted according to various embodiments of the present disclosure.

FIG. 8 is a graph illustrating characteristics of an antenna that uses two ground lines or one ground patch in the case in which an earphone plug is inserted into an earphone jack and characteristics of the antenna in the case in which the earphone plug is not inserted according to various embodiments of the present disclosure.

Referring to FIG. 8, the drawing illustrated at the upper side of FIG. 8 is a graph representing radiation efficiency as antenna characteristics in unit of dB, and the drawing illustrated at the lower side of FIG. 8 is a graph representing reflection coefficient as antenna characteristics in unit of dB.

In the drawing illustrated at the upper side of FIG. 8, the graph 810*a* is a graph corresponding to the case in which the earphone cable is not inserted into the earphone jack. The graph 810*b* is a graph corresponding to the case in which the earphone cable is inserted into the earphone jack. Further, in the drawing illustrated at the lower side of FIG. 8, the graph 820*a* is a graph corresponding to the case in which the earphone cable is not inserted into the earphone jack, and the graph 820*b* is a graph corresponding to the case in which the earphone cable is inserted into the earphone jack.

When the graph 810*a*, the graph 810*b*, the graph 820*a*, and the graph 820*b* are compared, it can be seen that the antenna characteristics are not significantly changed according to insertion of the earphone plug.

Accordingly, according to an embodiment of the present disclosure, deterioration of the performance of an antenna due to the earphone jack can be attenuated when the earphone plug is inserted, by locating the earphone jack on or over the ground patch, or locating the earphone jack between the two ground lines, and the performance of the antenna can be improved by isolating the two antennas.

Figure 9A:
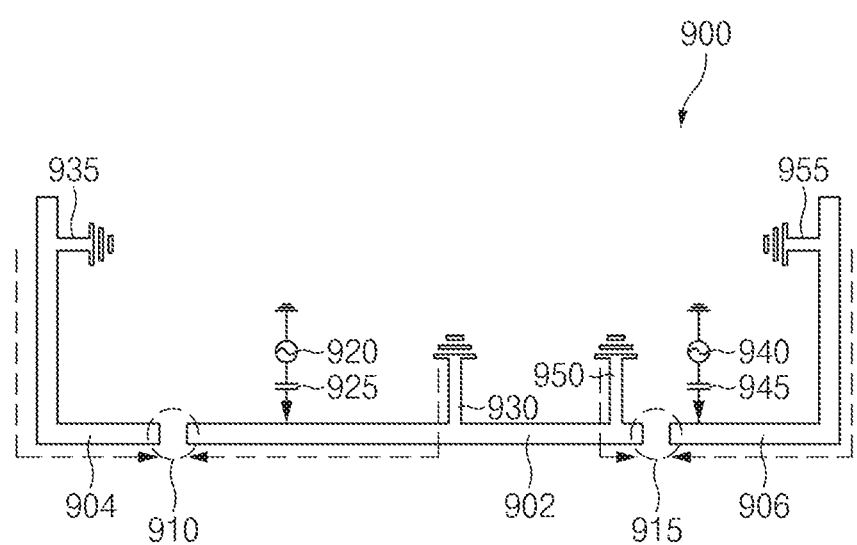
FIG. 9A is a view illustrating an antenna that uses an elongated metal member including a slit as a radiator according to various embodiments of the present disclosure.

FIG. 9A is a view illustrating an antenna that uses an elongated metal member including a slit (for example, an insulator) as a radiator according to various embodiments of the present disclosure. According to various embodiments of the present disclosure, as described with reference to FIG. 1, the metal member may include a metal housing of the electronic device.

Referring to FIG. 9A, the electronic device 900 may include a first elongated metal member 902, a second elongated metal member 904, and a third elongated metal member 906. The first elongated metal member 902 and the second elongated metal member 904 may be separated by a first slit 910, and the second elongated metal member 904 and the third elongated metal member 906 may be separated by a slit 915.

According to an embodiment, the first elongated metal member 902, the second elongated metal member 904, and the third elongated metal member 906 may be used as radiators of the antenna. For example, the first elongated metal member 902, the second elongated metal member 904, a feeder 920 connected to the first elongated metal member 902, a first ground part 930 connected to the first elongated metal member 902, and a ground part 935 connected to the second elongated metal member 904 may act as one antenna (hereinafter, a first antenna). In this case, a coupling phenomenon may occur between one end of the first elongated metal member 902 and one end of the second elongated metal member 904, which face each other while the first slit 910 being interposed therebetween.

According to an embodiment, the first elongated metal member 902, the third elongated metal member 906, a feeder 940 connected to the third elongated metal member 906, a second ground part 950 connected to the first elongated metal member 902, and a ground part 955 connected to the third elongated metal member 906 may act as one antenna (hereinafter, a second antenna). In this case, a coupling phenomenon may occur between an opposite end of the first elongated metal member 902 and one end of the third elongated metal member 906, which face each other with the second slit 915 interposed therebetween.

According to an embodiment, the first slit 910 and the second slit 915 may be disposed at locations with a desired interval such that communications may be performed at an intended frequency band by using the first antenna or the second antenna.

According to an embodiment, in the first antenna, the feeder 920 may be connected to the first elongated metal member 902 through the capacitive element 925 and may constitute an inverted F antenna (IFA) together with the first ground part 930 to resonate at a first resonance frequency, and may resonate at a second resonance frequency together with the second elongated metal member 904 that generates a capacitance in the first slit 910 that is close and includes the ground part 935.

According to an embodiment, in the second antenna, the feeder 940 may be connected to the third elongated metal member 906 through the capacitive element 945 and may constitute an IFA antenna together with the ground part 955 to resonate at a first resonance frequency, and may resonate at a second resonance frequency together with the first elongated metal member 902 that generates a capacitance in the second slit 915 that is close and includes the second ground part 950.

According to an embodiment, the first antenna may be connected to two ground parts (for example, the first ground part 930 of the first elongated metal member 902 and the ground part 935 of the second elongated metal member 904)

along different paths, and may be operated as a multiband antenna. According to an embodiment, the second antenna also may be connected to two ground parts (for example, the second ground part 950 of the first elongated metal member 902 and the ground part 955 of the third elongated metal member 906) along different paths, and may be operated as a multiband antenna.

According to an embodiment, the first antenna and the second antenna may perform communications at different frequency bands according to the lengths of the first ground part 930 of the first elongated metal member 902, the ground part 935 of the second elongated metal member 904, the second ground part 950 of the first elongated metal member 902, and the ground part 955 of the third metal member 906.

According to an embodiment, the first ground part 930 of the first elongated metal member 902, the ground part 935 of the second elongated metal member 904, the second ground part 950 of the first elongated metal member 902, and the ground part 955 of the third metal member 906 may have suitable lengths such that communications may be performed at an intended frequency band by using the first antenna or the second antenna.

According to an embodiment, the first antenna and the second antenna may perform communications at different frequency bands according to the locations of feeding points of the feeder 920 and the feeder 940. According to an embodiment, the feeder 920 or the feeder 940 may adjust the resonance frequencies of the antennas by adjusting the location of a feeding point of the feeder or adjusting the locations of the segmental parts 910 and 915 such that communications may be performed at an intended frequency band by using the first antenna or the second antenna.

Although the capacitive element 925 and the capacitive element 945 are connected to the feeder 920 of the first antenna and the feeder 940 of the second antenna, respectively, according to an embodiment, the feeder 920 of the first antenna and the feeder 940 of the second antenna may be directly connected to the first antenna and the second antenna, respectively, without using the capacitive element 925 and the capacitive element 945 according to another embodiment. According to an embodiment, the first antenna and the second antenna may be operated at different resonance frequencies according to the capacitances of the capacitive element 925 and the capacitive element 945 connected to the feeder 920 of the first antenna and the feeder 940 of the second antenna, respectively.

According to an embodiment, an interval between the first ground part 930 and the second ground part 950 of the first elongated metal member 902 may be changed according to the size of an elongated metal member mounted in a corresponding area (between the first ground part 930 and the second ground part 950 of the first elongated metal member 902). For example, an interval between the first ground part 930 and the second ground part 950 may be designed to be wider than the physical width of an input/output port (not illustrated) of a metallic material, for example, a micro USB port or an earphone jack. In this case, as the input/output port that is to be mounted between the first ground part 930 and the second ground part 950 is situated at a location of a low electric potential, an influence of a port for peripheral device on the antenna may decrease. Further, if a plug is inserted into the input/output port, a capacitive load and a dielectric loss, which occur in an antenna, may be influenced. However, if the input/output port is mounted between the first ground part 930 and the second ground part 950, the plug is inserted at a location of a low electric potential and thus the influence may decrease.

Figure 9B:
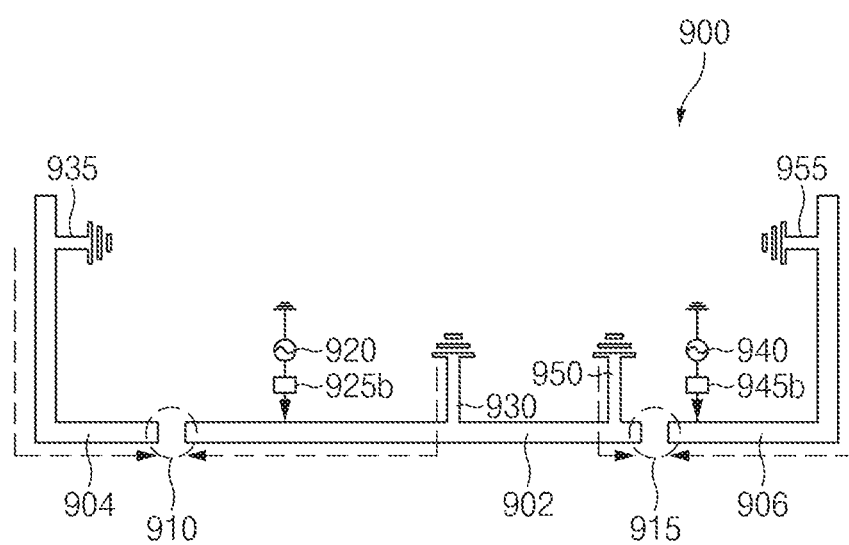
FIG. 9B is a view illustrating an antenna that uses an elongated metal member including a slit as a radiator according to various embodiments of the present disclosure.

FIG. 9B is a view illustrating an antenna that uses an elongated metal member (for example, an elongated metal member at least partially included in the housing) including a slit as a radiator according to various embodiments of the present disclosure. Referring to FIG. 9B, a box 925*b* that connects the feeder 920 and the first elongated metal member 902 may be implemented by a wire or an additional LC circuit.

According to an embodiment, a box 945*b* that connects the feeder 940 and the third elongated metal member 906 may be implemented by a general matching circuit instead of a lumped element. For example, the box 945*b* that connects the feeder 940 and the third elongated metal member 906 may be implemented by a wire or an additional LC circuit.

According to various embodiments of the present disclosure, the box 925*b* and the box 945*b* may be matching circuits or may be wires having an impedance that is close to 0 Ohm.

Although not illustrated in FIG. 9B, according to an embodiment, the electronic device may include a nonconductive structure that does not directly influence the characteristics of the antenna. The structure, for example, may be a structure for coupling a front case and a rear case of the electronic device. For example, the structure may be situated between a feeding source (situated on a printed circuit board (PCB)) corresponding to the feeder 940 of the second antenna and the third elongated metal member 906. In this case, due to the structure that blocks the third metal member 906, the feeder 940 may be connected to the third elongated metal member 906 while avoiding the structure (or detouring the structure).

According to various embodiments of the present disclosure, when the structure is not present, the feeder 940 may be connected from the feeding source to the third elongated metal member 906 without being interrupted, and thus the pattern of the feeder 940 may be designed for a desired resonance frequency. According to various embodiments of the present disclosure, the interval between the slits, the surface area of the antenna, the magnitude of the capacitance and/or the lengths of the radiators may be determined in consideration of the structure.

Figure 9C:
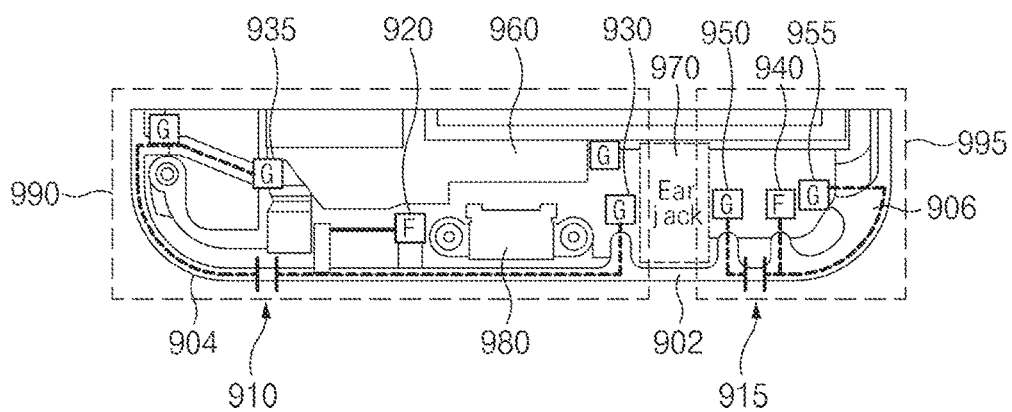
FIG. 9C is an internal arrangement view of an electronic device including the antenna of FIG. 9A or 9B according to various embodiments of the present disclosure.

FIG. 9C is an internal arrangement view of an electronic device including the antenna of FIG. 9A or 9B according to various embodiments of the present disclosure.

Referring to FIG. 9C, the electronic device 900 may include elongated metal members 902, 904, and 906 separated by slits 910 and 915, feeders 920 and 940, ground parts 930, 935, 950, and 955, a PCB 960, an earphone jack 970, and a USB port 980. The feeder 920 and 940, and the ground parts 930, 935, 950, and 955 may be mounted on the PCB 960.

Because the electronic device 900 of FIG. 9C corresponds to the electronic device 900 of FIG. 9A or 9B, the configurations of FIGS. 9A and 9B and the corresponding configurations of FIG. 9C have the same reference numerals. A repeated description of the contents described with reference to FIGS. 9A and 9B will be omitted.

The feeder 920 and the feeder 940 may be connected to the first elongated metal member 902 and the second elongated metal member 904 through a lumped capacitive element, and may be connected to the first elongated metal member 902 and the second elongated metal member 904 through a wire or a matching circuit including an additional LC circuit.

According to various embodiments of the present disclosure, the first antenna 990 may be operated at a low band of about 700 MHz to about 960 MHz and a mid band of about 1700 MHz to about 2100 MHz due to the feeder 920 of the first antenna 990. Further, the second antenna 995 may be operated at a mid band of about 1700 MHz to about 2100 MHz and a high band of about 2100 MHz to about 2700 MHz due to the feeder 940 of the second antenna 995.

Further, as illustrated in FIG. 9C, the earphone jack 970 may be situated between the first ground part 930 and the second ground part 950, and in this case, an influence of an earphone inserted into the earphone jack 970 on the performance of the antenna may be minimized.

Figure 9D:
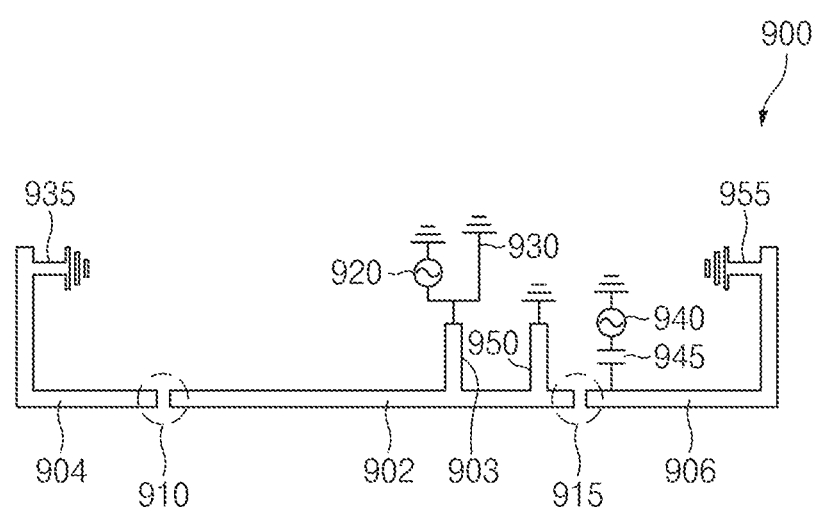
FIG. 9D is a view illustrating an antenna that uses an elongated metal member including a slit as a radiator according to various embodiments of the present disclosure.
Figure 9E:
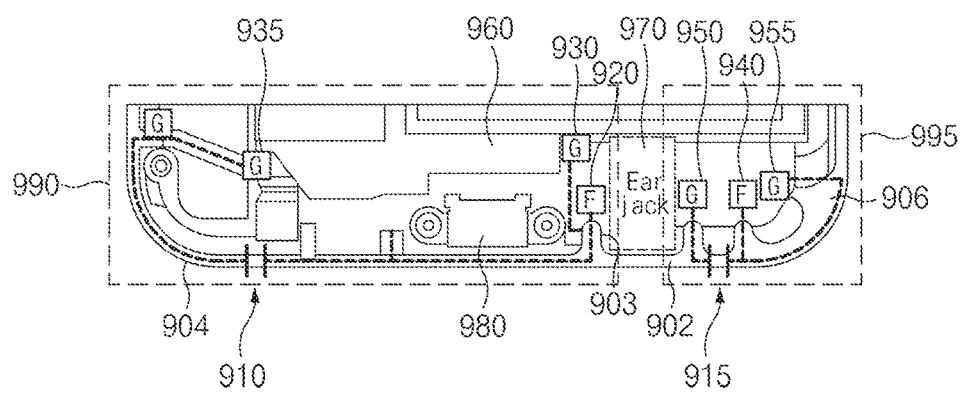
FIG. 9E is an internal arrangement view of an electronic device including the antenna of FIG. 9D according to various embodiments of the present disclosure.

FIG. 9D is a view illustrating an antenna that uses an elongated metal member including a slit as a radiator according to various embodiments of the present disclosure. FIG. 9E is an internal arrangement view of an electronic device including the antenna of FIG. 9D according to various embodiments of the present disclosure.

FIGS. 9D and 9E correspond to FIGS. 9A to 9C, and thus a repeated description of the contents mentioned with reference to FIGS. 9A to 9C will be omitted.

Because the electronic device 900 of FIG. 9E corresponds to the electronic device 900 of FIG. 9D, the configurations of FIG. 9D and the corresponding configurations of FIG. 9E have the same reference numerals.

According to an embodiment, the feeder 920 and the first ground part 930 connected to different points of the first elongated metal member 902 in FIG. 9A may be connected to the first elongated metal member 902 through one path in FIG. 9D.

For example, referring to the first elongated metal member 902 of FIG. 9E, the feeder 920 and the first ground part 930 may be connected to an extension 903 that extends from the first metal member 902 to a PCB 960. Because the locations of the feeders 920 of the first antenna 990 of FIG. 9E and the first antenna 990 of FIG. 9C are different from each other, the resonance frequency of the first antenna 990 of FIG. 9E and the resonance frequency of the first antenna 990 of FIG. 9C may be different from each other.

Figure 9F:
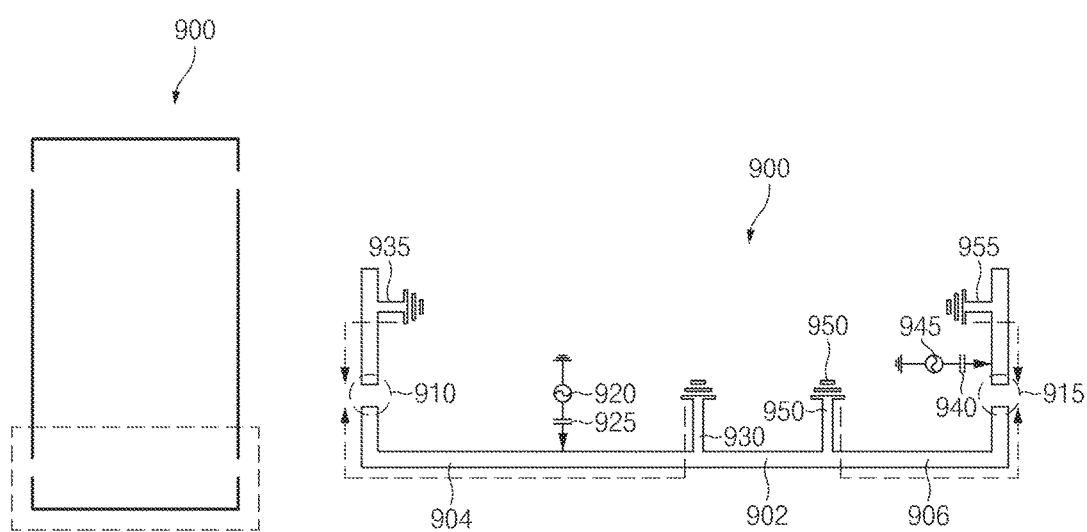
FIG. 9F is a view illustrating an antenna that uses an elongated metal member including a slit as a radiator according to various embodiments of the present disclosure.

FIG. 9F is a view illustrating an antenna that uses an elongated metal member including a slit as a radiator according to various embodiments of the present disclosure. Referring to FIG. 9F, the first slit 910 and the second slit 915 may be situated on a side of the electronic device 900 instead of a lower end of the electronic device 900 unlike the case of FIG. 9A.

Figure 10:
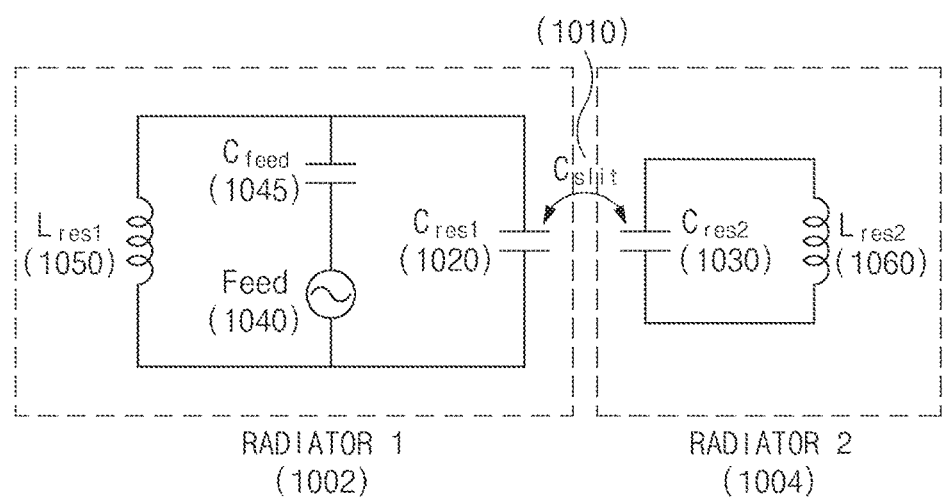
FIG. 10 is a circuit diagram illustrating an equivalent circuit of the first antenna or the second antenna including the slit of FIGS. 9A to 9F according to various embodiments of the present disclosure.

FIG. 10 is a circuit diagram illustrating an equivalent circuit of the first antenna or the second antenna including the slit of FIG. 9A according to various embodiments of the present disclosure. Hereinafter, an equivalent circuit of the first antenna of FIG. 9A will be described with reference to FIG. 10.

Referring to FIG. 10, the first antenna may include a first radiator 1002 and a second radiator 1004 separated by a slit. The first radiator 1002 may correspond to the first elongated metal member 902 of FIGS. 9A to 9F, the second radiator 1004 may correspond to the second elongated metal member 904 of FIGS. 9A to 9F, and the slit may correspond to the first slit 910 of FIGS. 9A to 9F.

According to an embodiment, a capacitor Cslit 1010 corresponding to the slit 1010 may be a capacitive slit coupling capacitor formed by the first radiator 1002 and the second radiator 1004 that face the slit. Further, Cres1 1020 of the first radiator 1002 and Cres2 1030 of the second radiator 1004 that are influenced by Cslit 1010 may represent the electrical lengths of the two radiators. Further, Lres1 1050 of the first radiator 1002 and Lres2 1060 of the second radiator 1004 may represent the physical lengths of the two radiators. The feeder 1040 and Cfeed 1045 of the first radiator 1002 may correspond to the feeder 920 and the capacitor 925 of FIGS. 9A to 9F, respectively.

According to various embodiments of the present disclosure, in the equivalent circuit, the resonance frequencies of the first radiator 1002 and the second radiator 1004 may be determined by Cslit 1010, Cres1 1020, Cres2 1030, Cfeed 1045, Lres1 1050, and Lres2 1060.

For example, the value of Cfeed 1045 may represent a connection method (for example, direct feeding and coupling feeding) of the feeder 1040 and the first radiator 1002. According to the connection method, the antenna may have different resonance frequencies. Further, the antenna may have different resonance frequencies according to a location at which the feeder 1040 is connected to the antenna. The description thereof will be described in detail with reference to FIGS. 11A to 11D.

Figure 11A:
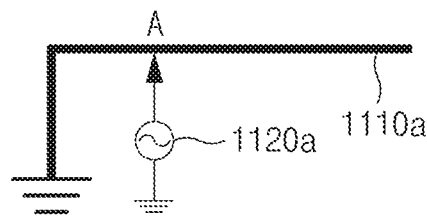
FIG. 11A is a view illustrating direct feeding for a first location of an antenna radiator according to various embodiments of the present disclosure.
Figure 11B:
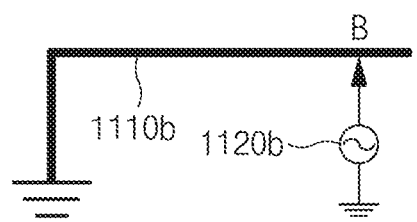
FIG. 11B is a view illustrating direct feeding for a second location of an antenna radiator according to various embodiments of the present disclosure.
Figure 11C:
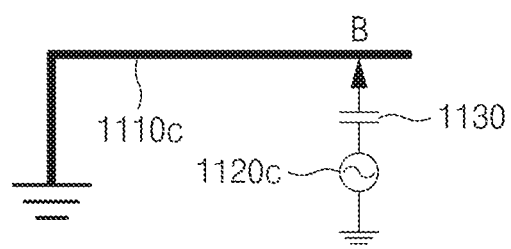
FIG. 11C is a view illustrating coupled feeding for a second location of an antenna radiator according to various embodiments of the present disclosure.

FIG. 11A is a view illustrating direct feeding for a first location of an antenna radiator according to various embodiments of the present disclosure. FIG. 11B is a view illustrating direct feeding for a second location of an antenna radiator according to various embodiments of the present disclosure. FIG. 11C is a view illustrating coupled feeding for a second location of an antenna radiator according to various embodiments of the present disclosure.

Referring to FIGS. 11A and 11B, FIGS. 11A and 11B will be compared. Referring to FIG. 11A, the feeder 1120a may be connected to a first point A of the radiator 1110a, and the feeder 1120a may not be connected to a separate capacitor. Referring to FIG. 11B, the feeder 1120b may be connected to a second point B of the radiator 1110b, and the feeder 1120b may not be connected to a separate capacitor. For example, when the radiator 1110a and the radiator 1110b are the same, only connection points of the radiators and the feeders are different in the antennas of FIGS. 11A and 11B.

According to an embodiment, the case in which a capacitor having a high capacitance (for example, 100 pF) is connected to the feeder as well as the case in which a capacitor is not connected to the feeder may be regarded as direct feeding.

Next, FIGS. 11B and 11C will be compared. Referring to FIG. 11C, like in FIG. 11B, the feeder 1120c may be connected to a second point B of the radiator 1110c, and unlike in FIG. 11B, the feeder 1120c may be connected to the capacitor 1130. For example, when the radiator 1110b and the radiator 1110c are the same, only inclusions of the capacitor in the feeders are different in the antennas of FIGS. 11B and 11C.

According to various embodiments of the present disclosure, the capacitor may be implemented by a copper pad on a PCB, or may be implemented by a separate antenna pattern that is coupled in a capacitive manner.

Figure 11D:
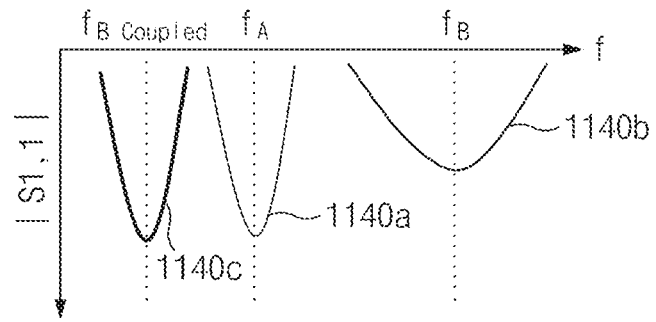
FIG. 11D is a graph illustrating reflection coefficients according to the frequencies of the antennas of FIGS. 11A to 11C according to various embodiments of the present disclosure.

FIG. 11D is a graph illustrating reflection coefficients according to the frequencies of the antennas of FIGS. 11A to 11C according to various embodiments of the present disclosure. The antenna characteristic graph of FIG. 11D may be a graph acquired with the premise that the electrical lengths of the antennas of FIGS. 11A to 11C are the same.

Referring to FIG. 11D, the characteristic graphs 1140a, 1140b, and 1140c of FIG. 11D may correspond to the antenna of FIG. 11A, the antenna of FIG. 11B, and the antenna of FIG. 11C, respectively. When the characteristic graphs 1140a and 1140b are compared, it can be seen that the resonance frequency of the antenna of FIG. 11A is lower than the resonance frequency of the antenna of FIG. 11B. According to the locations at which the feeders are connected, the resonance frequency (fA) of the antenna of FIG.

11A may represent the characteristics of an IFA corresponding to a length of λ/4 of the radiator 1110a, and the resonance frequency of the antenna of FIG. 11B may represent the characteristics of a loop or slit antenna corresponding to a length of λ/2 of the radiator 1110b. For example, the antenna of FIG. 11A may have a resonance frequency that is lower than that of the antenna of FIG. 11B, and the antenna of FIG. 11B may have a resonance frequency that is higher than that of the antenna of FIG. 11A.

According to an embodiment, the antenna of FIG. 11C may resonate at a frequency ($f_{B-Coupled}$, 1 that is lower than λ/4 by a loading effect of Cfeed. For example, the antenna of FIG. 11C may be advantageous in miniaturization.

According to an embodiment, even though the radiators have the same physical length and the same shape, the resonances of the antennas may be different according to the feeding manners.

Hereinafter, a change in characteristics of an antenna according to the capacitance of Cslit will be described with reference to FIGS. 12A and 12B.

Figure 12A:
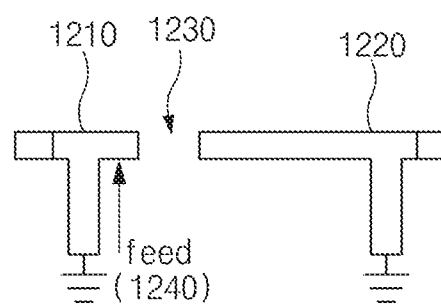
FIG. 12A is a view illustrating an antenna including a radiator separated by a slit according to various embodiments of the present disclosure.

FIG. 12A is a view illustrating an antenna including a radiator separated by a slit according to various embodiments of the present disclosure. FIG. 12B is a view illustrating an antenna characteristic graph based on a change in the capacitance of a capacitor (Cslit) corresponding to the slit of the antenna of FIG. 12A.

Referring to the antenna of FIG. 12A, a first radiator 1210 and a second radiator 1220 may be separated by a slit 1230 interposed therebetween, and the feeder 1240 may be connected to the first radiator 1210. According to an embodiment, the capacitance of Cslit may be changed by varying the width of the slit 1230. Further, the characteristics of the antenna may be changed by varying the capacitance of Cslit.

Figure 12B:
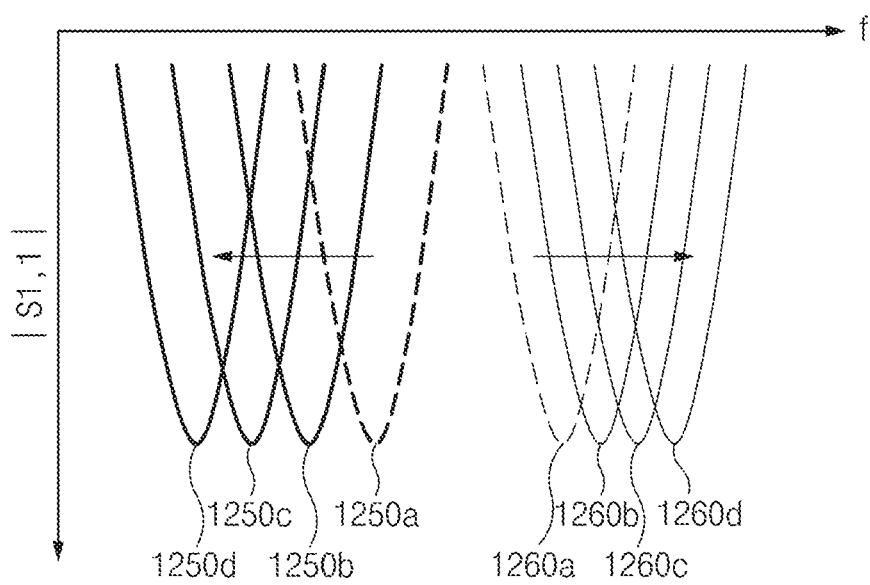
FIG. 12B is a view illustrating an antenna characteristic graph based on a change in the capacitance of a capacitor (Cslit) corresponding to the slit of the antenna of FIG. 12A according to various embodiments of the present disclosure.

FIG. 12B is a view illustrating an antenna characteristic graph based on a change in the Cslit corresponding to the slit of the antenna of FIG. 12A according to various embodiments of the present disclosure.

Referring to FIG. 12B, a characteristic graph 1250a may be a graph representing a basic λ/4 resonance generated by the second radiator 1220, and a characteristic graph 1260a may be a graph representing a basic λ/4 resonance generated by the first radiator 1210. Here, the difference between the resonance frequency of the first radiator 1210 and the resonance frequency of the second radiator 1220 may become larger as Cslit is added between the first radiator 1210 and the second radiator 1220. For example, as the capacitance of Cslit becomes higher, the resonance frequency of the second radiator 1220 may be changed from 1250a to 1250d via 1250b and 1250c. Similarly, as the capacitance of Cslit becomes higher, the resonance frequency of the first radiator 1210 may be changed from 1260a to 1260d via 1260b and 1260c.

According to an embodiment, when the capacitance of Cslit is very high, the first radiator 1210 and the second radiator 1220 may be short-circuited, and thus the difference between the resonance frequency of the first radiator 1210 and the resonance frequency of the second radiator 1220 may not increase to the infinity even when the capacitance of Cslit becomes higher.

Figure 13A:
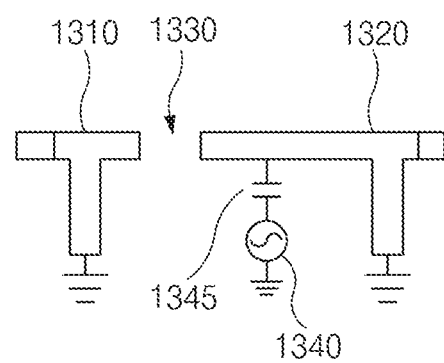
FIG. 13A is a view illustrating a radiator separated by a slit and coupled feeding for the radiator according to various embodiments of the present disclosure.
Figure 13B:
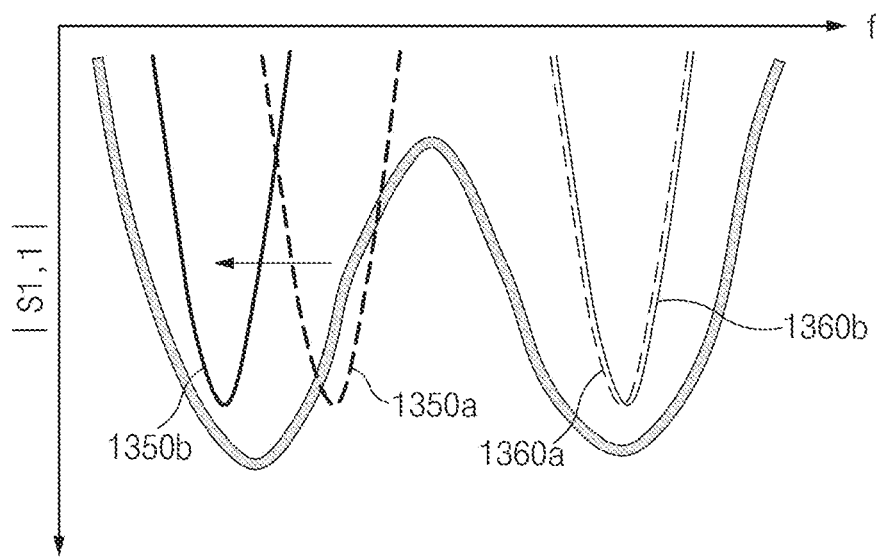
FIG. 13B is a view illustrating an antenna characteristic graph based on a change in the capacitance of a capacitor (Cfeed) of a feeder corresponding to the slit of the antenna of FIG. 13A according to various embodiments of the present disclosure.

FIG. 13A is a view illustrating a radiator separated by a slit and coupled feeding for the radiator according to various embodiments of the present disclosure. FIG. 13B is a view illustrating an antenna characteristic graph based on a change in the capacitance of a capacitor (Cfeed) corresponding to the slit of the antenna of FIG. 13A.

Referring to the antenna of FIG. 13A, a first radiator 1310 and a second radiator 1320 may be separated by a slit 1330 interposed therebetween, and the feeder 1340 may be connected (coupled-fed) to the second radiator 2 through the capacitor (Cfeed) 1345. According to various embodiments of the present disclosure, the antenna characteristics of the antenna may be changed by varying the capacitance of Cfeed 1345.

Referring to FIG. 13B, antenna characteristic graphs 1350a and 1350b correspond to the second radiator 1320, and antenna characteristic graphs 1360a and 1360b correspond to the first radiator 1310.

According to an embodiment, the antenna characteristic graphs 1350a and 1360a correspond to direct feeding, and the antenna characteristic graphs 1350b and 1360b correspond to coupled feeding.

Referring to the antenna characteristic graphs 1360a and 1360b of the first radiator 1310, it can be seen that the resonance frequencies of the first radiator 1310 in direct feeding and coupled feeding are the same or extremely similar. This is because the feeder 1340 is connected to the second radiator 1320 instead of the first radiator 1310.

Referring to the antenna characteristic graphs 1350a and 1350b, it can be seen that the resonance frequencies of the second radiator 1320 in direct feeding and coupled feeding are different. This is because the feeder 1340 is connected to the second radiator 1320 instead of the first radiator 1310.

According to an embodiment, it can be seen that the resonance frequency of the antenna during coupled feeding is lower than the resonance frequency of the antenna during direct feeding. Due to the addition of the capacitor 1345, the resonance impedance of the antenna varies, and because the electrical length of the radiator becomes longer, the resonance may be lowered without changing the physical length of the radiator. Because the electrical length of the radiator and the resonance frequency of the antenna are inversely proportional to each other, the antenna having a radiator of a relatively large electrical length and operated in a coupled feeding manner may have a low resonance frequency as compared with the antenna having a radiator of a relatively small electrical length and operated in a direct feeding manner.

Figure 14A:
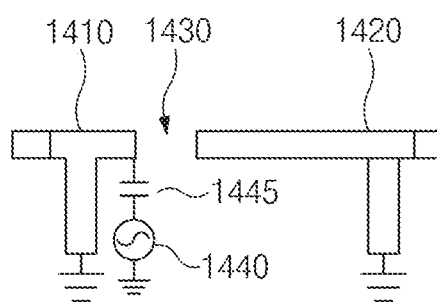
FIG. 14A is a view illustrating a radiator separated by a slit and coupled feeding for the radiator according to another embodiment of the present disclosure.
Figure 14B:
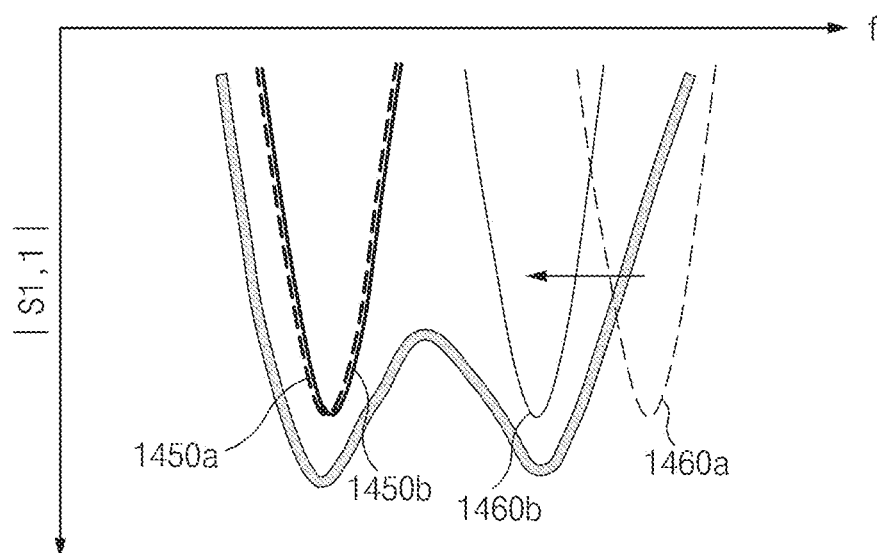
FIG. 14B is a view illustrating an antenna characteristic graph based on a change in the capacitance of a capacitor (Cfeed) of a feeder corresponding to the slit of the antenna of FIG. 14A according to various embodiments of the present disclosure.

FIG. 14A is a view illustrating a radiator separated by a slit and coupled feeding for the radiator according to another embodiment of the present disclosure. FIG. 14B is a view illustrating an antenna characteristic graph based on a change in the capacitance of a capacitor (Cfeed) corresponding to the slit of the antenna of FIG. 14A.

Referring to the antenna of FIG. 14A, a first radiator 1410 and a second radiator 1420 may be separated by a slit 1430 interposed therebetween, and the feeder 1440 may be connected (coupled-fed) to the first radiator 1410 through the capacitor (Cfeed) 1445. According to an embodiment, the characteristics of the antenna may be changed by varying the capacitance value of Cfeed 1445. It can be seen in FIGS. 13A and 14A that a difference is present according to whether the feeder is connected to the first radiator or the second radiator.

Referring to FIG. 14B, antenna characteristic graphs 1450a and 1450b correspond to the second radiator 1420, and antenna characteristic graphs 1460a and 1460b correspond to the first radiator 1410.

According to various embodiments of the present disclosure, the antenna characteristic graphs 1450a and 1460a correspond to direct feeding, and the antenna characteristic graphs 1450b and 1460b correspond to coupled feeding.

Referring to the antenna characteristic graphs 1450a and 1450b of the second radiator 1420, it can be seen that the resonance frequencies of the second radiator 1420 in direct feeding and coupled feeding are the same or extremely similar. This is because the feeder 1440 is connected to the first radiator 1410 instead of the second radiator 1420.

Referring to the antenna characteristic graphs 1460*a* and 1460*b*, it can be seen that the resonance frequencies of the first radiator 1410 in direct feeding and coupled feeding are different. This is because the feeder 1440 is connected to the first radiator 1410 instead of the second radiator 1420.

According to an embodiment, it can be seen that the resonance frequency of the antenna during coupled feeding is lower than the resonance frequency of the antenna during direct feeding. This is because the electrical length of the radiator may become longer due to the addition of the capacitor 1445. Because the electrical length of the radiator and the resonance frequency of the antenna are inversely proportional to each other, the antenna having a radiator of a relatively large electrical length and operated in a coupled feeding manner may have a low resonance frequency as compared with the antenna having a radiator of a relatively small electrical length and operated in a direct feeding manner.

Figure 15:
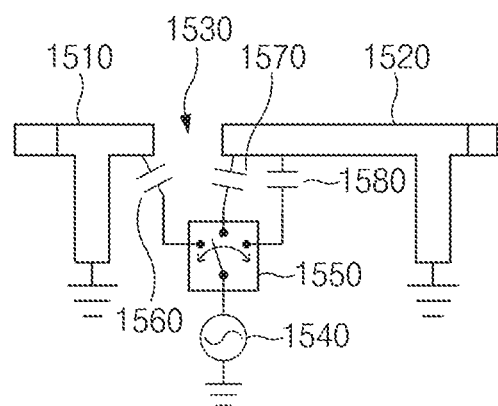
FIG. 15 is a diagram illustrating an antenna in which a point at which a feeder is connected to a radiator may be adjusted by using a controller according to various embodiments of the present disclosure.

FIG. 15 is a diagram illustrating an antenna in which a point at which a feeder is connected to a radiator may be adjusted by using a controller according to various embodiments of the present disclosure.

Referring to the antenna of FIG. 15, a first radiator 1510 and a second radiator 1520 may be separated by a slit 1530 interposed therebetween, and the feeder 1540 may be connected to the first radiator 1510 or the second radiator 1520 through a controller 1550.

For example, the first capacitor (Cfeed) 1560 may be connected to the first radiator 1510, the second capacitor (Cfeed) 1570 may be connected to a first point of the second radiator 1520, and the third capacitor (Cfeed) 1580 may be connected to a second point of the second radiator 1520. Further, because the controller 1550 may connect any one of the first capacitor (Cfeed) 1560, the second capacitor (Cfeed) 1570, and the third capacitor (Cfeed) 1580 to the feeder 1540, the feeder 1540 may be connected to the first radiator 1510 or the second radiator 1520 by the controller 1550. For example, the antenna may have different frequency characteristics according to an operation of the controller 1550.

According to an embodiment, the controller 1550 may receive a control signal for a capacitor, which is to be connected, from a communication module of an electronic device (for example, the electronic device 900), and may selectively connect any one capacitor to the feeder 1540 according to the received control signal. The communication module may generate the control signal for selecting a capacitor that is suitable for a frequency band, which is to be used.

Figure 16:
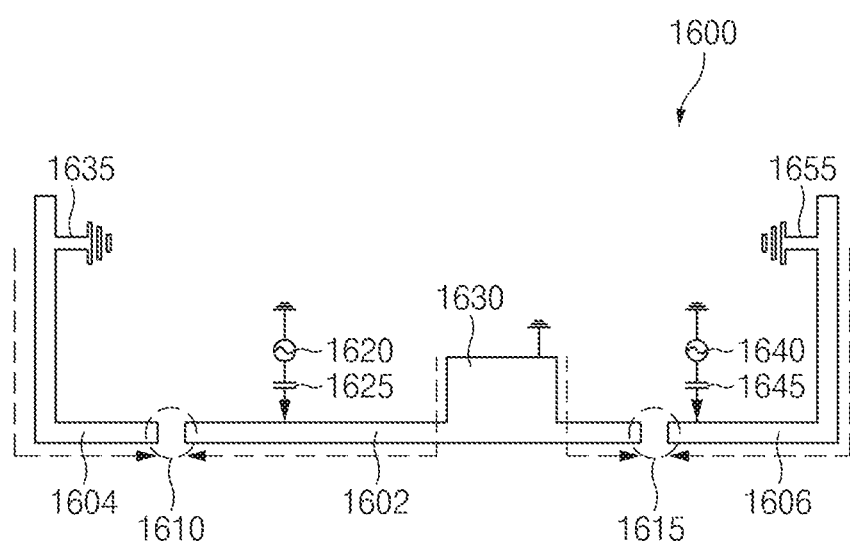
FIG. 16 is a view illustrating an antenna that uses an elongated metal member including a slit as a radiator according to various embodiments of the present disclosure.

FIG. 16 is a view illustrating an antenna that uses an elongated metal member including a slit as a radiator according to various embodiments of the present disclosure. According to various embodiments of the present disclosure, as described above, the metal member may include a metal housing of the electronic device. In the following, the mentioned 'elongated metal member' may be one according to some of the various embodiments of the present disclosure in which the metal member is used.

Referring to FIG. 16, the electronic device 1600 may include a first elongated metal member 1602, a second elongated metal member 1604, and a third elongated metal member 1606 at a portion thereof. The first elongated metal member 1602 and the second elongated metal member 1604 may be separated by a first slit 1610, and the second elongated metal member 1604 and the third elongated metal member 1606 may be separated by a slit 1615.

According to various embodiments of the present disclosure, the first elongated metal member 1602, the second elongated metal member 1604, and the third elongated metal member 1606 may be used as radiators of the antenna. For example, the first elongated metal member 1602, the second elongated metal member 1604, a feeder 1620 and capacitive element 1625 connected to the first elongated metal member 1602, a ground patch 1630 connected to the first elongated metal member 1602, and a ground part 1635 connected to the second elongated metal member 1604 may act as one antenna (hereinafter, a first antenna). In this case, a coupling phenomenon may occur between one end of the first elongated metal member 1610 and one end of the second elongated metal member 1602, which face each other while the first slit 1604 being interposed therebetween.

According to an embodiment, the first elongated metal member 1602, the third elongated metal member 1606, a feeder 1640 and capacitive element 1645 connected to the third elongated metal member 1606, a ground patch 1630 connected to the first elongated metal member 1602, and a ground part 1655 connected to the third elongated metal member 1606 may act as one antenna (hereinafter, a second antenna). In this case, a coupling phenomenon may occur between an opposite end of the first elongated metal member 1602 and one end of the third elongated metal member 1606, which face each other while the second slit 1615 being interposed therebetween.

When FIGS. 9A to 9F and FIG. 16 are compared, the first elongated metal member 902 of FIGS. 9A to 9F includes two line type ground parts such that one line type ground part (for example, the ground part 930 of the first elongated metal member 902) may be connected to a first antenna and the other line type ground part (for example, the second ground part 950 of the first metal member 902) may be connected to a second antenna. The first metal member 1602 of FIG. 16 may include one patch type ground part (for example, the ground patch 1630).

The line type ground part may have a configuration in which the first elongated metal member 902 and the ground area of the PCB are point-to-point connected to each other, and the patch type ground part may have a configuration in which the first elongated metal member 902 and the ground area of the PCB are surface-to-surface connected to each other. The line type ground part and the patch type ground part may be operated similarly. The description of the first ground part 930 and the second ground part 950 of the first elongated metal member 902 of FIGS. 9A to 9F may be applied to the ground patch 1630 of FIG. 16, and thus a repeated description thereof will be omitted.

Figure 17A:
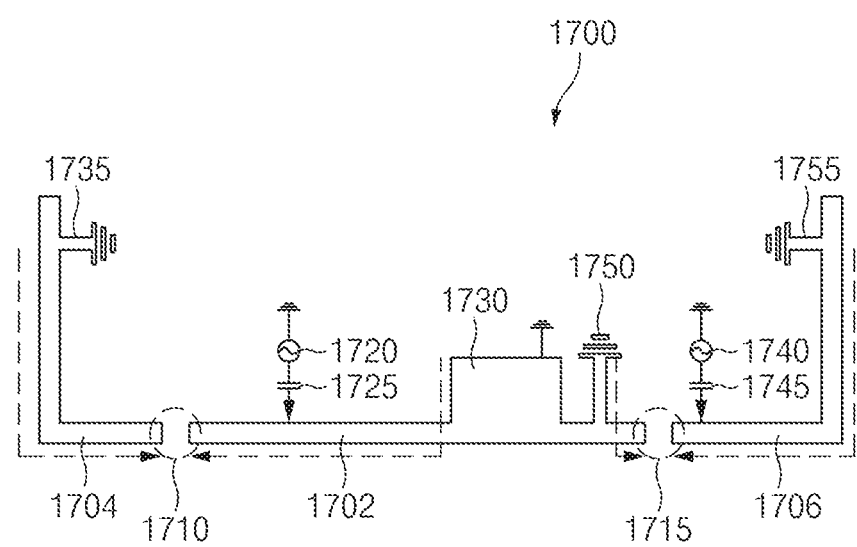
FIG. 17A is a view illustrating an antenna that uses an elongated metal member including a slit as a radiator according to various embodiments of the present disclosure.

FIG. 17A is a view illustrating an antenna that uses a metal member including a slit as a radiator according to various embodiments of the present disclosure.

Referring to FIG. 17A, the electronic device 1700 may include a first elongated metal member 1702, a second elongated metal member 1704, and a third elongated metal member 1706. The first elongated metal member 1702 and the second elongated metal member 1704 may be separated by a first slit 1710, and the second elongated metal member 1704 and the third elongated metal member 1706 may be separated by a slit 1715.

According to various embodiments of the present disclosure, the first elongated metal member 1702, the second elongated metal member 1704, and the third elongated metal member 1706 may be used as radiators of the antenna. For example, the first elongated metal member 1702, the second elongated metal member 1704, a feeder 1720 and a capacitive element 1725 connected to the first elongated metal member 1702, a ground patch 1730 connected to the first elongated metal member 1702, and a ground part 1735 connected to the second elongated metal member 1704 may act as one antenna (hereinafter, a first antenna). In this case, a coupling phenomenon may occur between one end of the first elongated metal member 1710 and one end of the second elongated metal member 1704, which face each other while the first slit 1704 being interposed therebetween.

According to an embodiment, the first elongated metal member 1702, the third elongated metal member 1706, a feeder 1740 and a capacitive element 1745 connected to the third elongated metal member 1706, a ground line 1750 connected to the first elongated metal member 1702, and a ground part 1755 connected to the third elongated metal member 1706 may act as one antenna (hereinafter, a second antenna). In this case, a coupling phenomenon may occur between an opposite end of the first elongated metal member 1702 and one end of the third elongated metal member 1706, which face each other while the second slit 1715 being interposed therebetween.

When FIG. 9A and FIG. 17A are compared, the first elongated metal member 902 of FIGS. 9A to 9F includes two line type ground parts such that one line type ground part (for example, the ground part 930 of the first elongated metal member 902) may be connected to a first antenna and the other line type ground part (for example, the second ground part 950 of the first metal member 902) may be connected to a second antenna. The first metal member 1702 of FIG. 17A may include one patch type ground part (for example, the ground patch 1730) and one line type ground part 1750.

The line type ground part may have a configuration in which the first elongated metal member 902 and the ground area of the PCB are point-to-point connected to each other, and the patch type ground part may have a configuration in which the first elongated metal member 902 and the ground area of the PCB are surface-to-surface connected to each other. The line type ground part and the patch type ground part may be operated similarly. The description of the first ground part 930 and the second ground part 950 of the first elongated metal member 902 of FIG. 9A may be applied to the ground patch 1730 and the ground line 1750 of FIGS. 17A and 17B, and thus a repeated description thereof will be omitted.

Figure 17B:
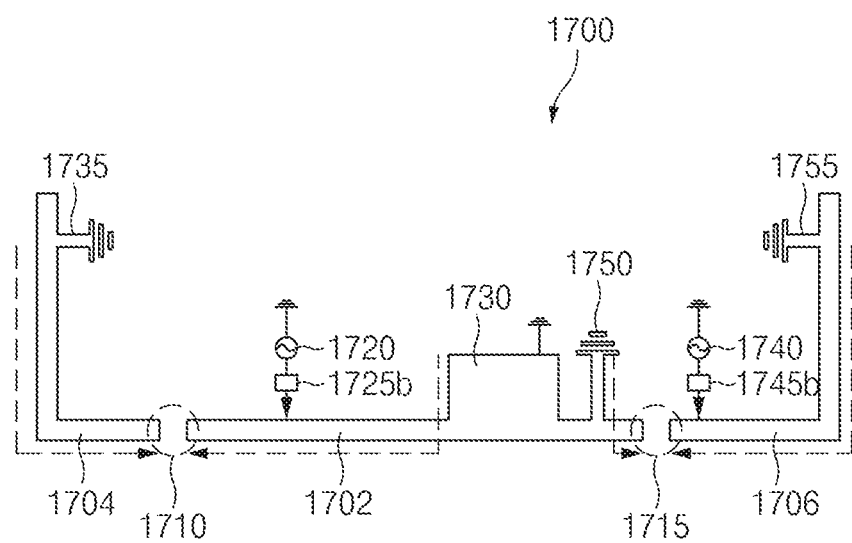
FIG. 17B is a view illustrating an antenna that uses an elongated metal member including a slit as a radiator according to various embodiments of the present disclosure.

FIG. 17B is a view illustrating an antenna that uses a metal member including a slit as a radiator according to various embodiments of the present disclosure. Referring to FIG. 17B, a box 1725*b* that connects the feeder 1720 and the first elongated metal member 1702 may be implemented by a wire or a general matching circuit.

According to an embodiment, a box 1745*b* that connects the feeder 1740 and the third elongated metal member 1706 may be implemented by a wire or a general matching circuit.

According to various embodiments of the present disclosure, the box 1725*b* and the box 1745*b* may be matching circuits or may be wires having an impedance that is close to 0 Ohm.

Figure 18:
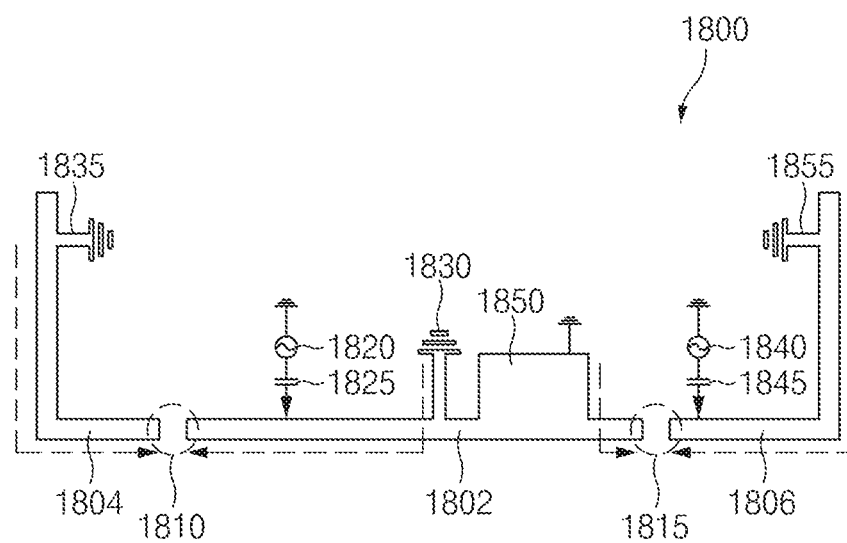
FIG. 18 is a view illustrating an antenna that uses an elongated metal member including a slit as a radiator according to various embodiments of the present disclosure.

FIG. 18 is a view illustrating an antenna that uses an elongated metal member including a slit as a radiator according to various embodiments of the present disclosure.

Referring to FIG. 18, the electronic device 1800 may include a first elongated metal member 1802, a second elongated metal member 1804, and a third elongated metal member 1806. The first elongated metal member 1802 and the second elongated metal member 1804 may be separated by a first slit 1810, and the second elongated metal member 1804 and the third elongated metal member 1806 may be separated by a slit 1815.

According to an embodiment, the first elongated metal member 1802, the second elongated metal member 1804, and the third elongated metal member 1806 may be used as radiators of the antenna. For example, the first elongated metal member 1802, the second elongated metal member 1804, a feeder 1820 and a capacitive element 1825 connected to the first elongated metal member 1802, a ground line 1830 connected to the first elongated metal member 1802, and a ground part 1835 connected to the second elongated metal member 1804 may act as one antenna (hereinafter, a first antenna). In this case, a coupling phenomenon may occur between one end of the first elongated metal member 1802 and one end of the second elongated metal member 1804, which face each other while the first slit 1810 being interposed therebetween.

According to an embodiment, the first elongated metal member 1802, the third elongated metal member 1806, a feeder 1840 and a capacitive element 1845 connected to the third elongated metal member 1806, a ground patch 1850 connected to the first elongated metal member 1802, and a ground part 1855 connected to the second elongated metal member 1806 may act as one antenna (hereinafter, a second antenna). In this case, a coupling phenomenon may occur between an opposite end of the first elongated metal member 1802 and one end of the third elongated metal member 1806, which face each other while the second slit 1810 being interposed therebetween.

When FIGS. 17A, 17B, and 18 are compared, the locations of the ground line and the ground patch connected to the first elongated metal members illustrated in FIGS. 17A, 17B, and 18 may be exchanged with each other. Accordingly, a repeated description thereof will be omitted.

Referring to FIGS. 16, 17A, 17B, and 18, according to various embodiments of the present disclosure, the width of the ground patch may be changed according to the size of a configuration, which is to be mounted in a corresponding area (a location corresponding to the ground patch). For example, the width of the ground patch may be larger than the physical width of an input/output port (not illustrated) of a metallic material, for example, a micro USB port or an earphone jack, for peripheral devices. In this case, as a port for peripheral devices, which is to be mounted on the ground patch, is located at a low electric potential, an Influence on the antenna by the port may decrease. Further, if a plug is inserted into the input/output port, a capacitive load and a dielectric loss, which occur in an antenna, may be influenced. Because the plug is inserted into a site having a low electric potential if the port for peripheral devices is mounted on the ground patch, the influence may decrease.

Further, the ground line or the ground patch may radiate waves while the first antenna and the second antenna do not interfere with each other.

Figure 19:
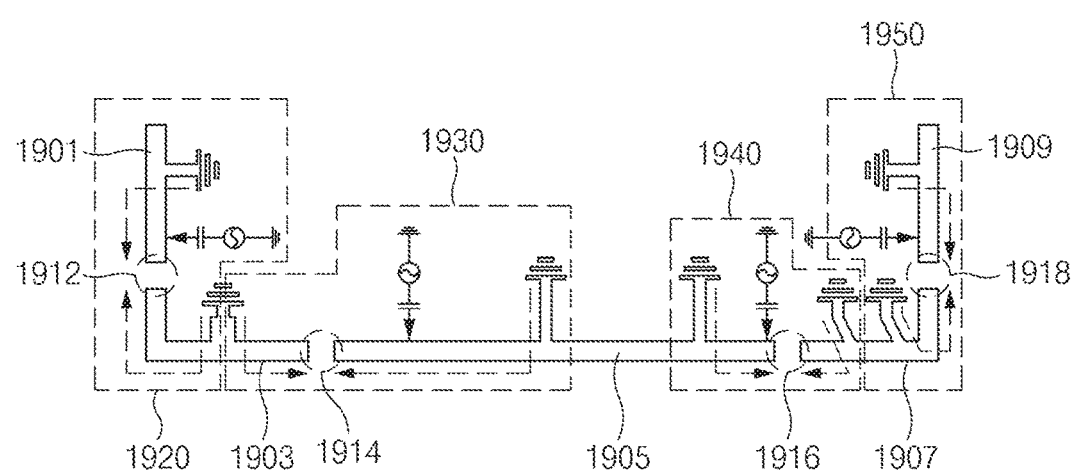
FIG. 19 is a view illustrating an antenna that uses an elongated metal member including a slit as a radiator according to various embodiments of the present disclosure.

FIG. 19 is a view illustrating an antenna that uses a metal member including a slit as a radiator according to various embodiments of the present disclosure.

Referring to FIG. 19, according to various embodiments of the present disclosure, the metal member may be separated by a slit such that an antenna operated at a desired frequency band is designed, and the number of slits may not be limited to two as in FIGS. 9A to 9F, 10, 11A to 11F, 12A to 12B, 13A to 13B, 14A to 14B, 15, 16, 17A to 17B, and 18. Even when the metal member is separated by more slit in FIG. 19, various methods for designing an antenna operated at a desired frequency band may be used.

According to an embodiment, the metal member at a lower end of the electronic device may be separated into a first elongated metal member 1901, a second elongated metal member 1903, a third elongated metal member 1905, a fourth elongated metal member 1907, and a fifth elongated metal member 1909 by four slits, that is, a first slit 1912, a second slit 1914, a third slit 1916, and a fourth slit 1918.

Similarly to FIGS. 9A to 9F, 10, 11A to 11F, 12A to 12B, 13A to 13B, 14A to 14B, 15, 16, 17A to 17B, and 18, an antenna according to an embodiment may include two elongated metal members separated by a slit, one feeder, and two ground parts connected to the two elongated metal members, respectively. In this case, the antenna may be operated as a multiband antenna.

Referring to FIG. 19, the electronic device may include a first antenna 1920, a second antenna 1930, a third antenna 1940, and a fourth antenna 1950. The antennas correspond to the antennas described with reference to the previously mentioned drawings, and thus a more detailed description thereof will be omitted.

Figure 20A:
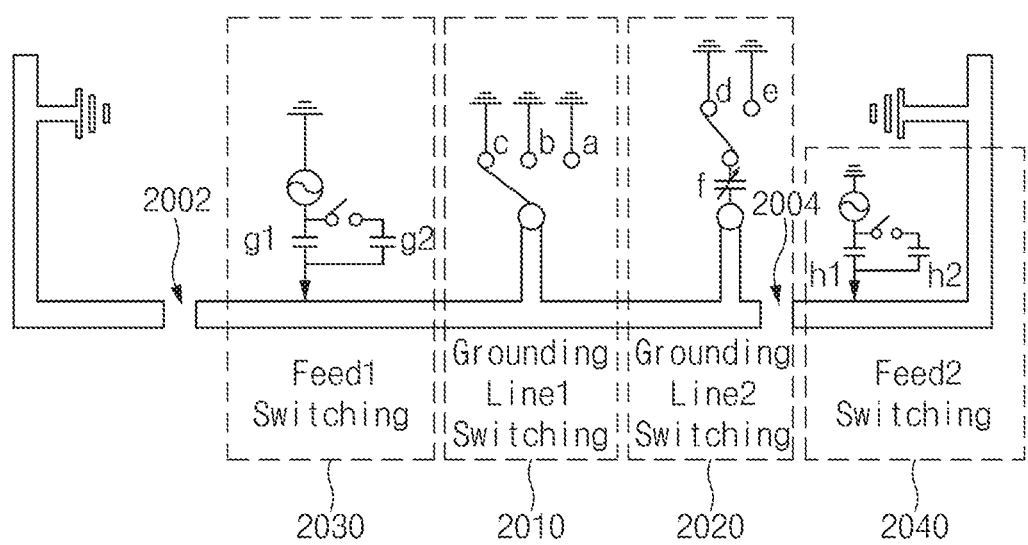
FIG. 20A is a view illustrating an antenna, characteristics of which may be changed through switching, when the antenna uses an elongated metal member including a slit as a radiator according to various embodiments of the present disclosure.

FIG. 20A is a view illustrating an antenna, characteristics of which may be changed through switching, when the antenna uses a metal member including a slit as a radiator according to various embodiments of the present disclosure.

Referring to FIG. 20A, according to an embodiment, the first ground part 2010 may change the electrical length of a radiator by selecting any one of a first ground line a, a second ground line b, and a third ground line C. Accordingly, the resonance frequency of the antenna may be changed.

According to an embodiment, the second ground part 2020 may change the length of the radiator by selecting any one of a first ground line d and a second ground line e. Further, the second ground part 2020 may change the resonance frequency of the antenna by changing the capacitance value of the variable capacitor f.

According to an embodiment, the first feeder 2030 may be connected to a metal member through a first capacitor g1. When the switch of the first feeder 2030 is closed, the first capacitor g1 is connected in parallel to a second capacitor g2. The capacitance of the synthesized capacitor is a sum of the capacitance of the first capacitor g1 and the capacitance of the second capacitor g2. When the switch is closed, the capacitance becomes higher and thus the characteristics of the antenna may be changed.

According to an embodiment, the second feeder 2040 may determine whether only a first capacitor h1 is to be used or both the first capacitor h1 and a second capacitor h2 are to be used, through switching. Accordingly, the characteristics of the antenna may be changed.

According to an embodiment, the electronic device may adjust (switching of a frequency band is possible) the resonance frequency by using switching of the first ground part 2010, the second ground part 2020, the first feeder 2030, and the second feeder 2040. Accordingly, the antenna of the electronic device may cover various frequency bands, and a network service may be used at a frequency band allocated to another nation or another communication company.

According to various embodiments of the present disclosure, the switching operation may be performed based on a control signal received from a processor (for example, a communication processor (CP) or an AP) of the electronic device. The processor may determine a suitable frequency band based on a communication state and a communication method selected by the user.

Figure 20B:
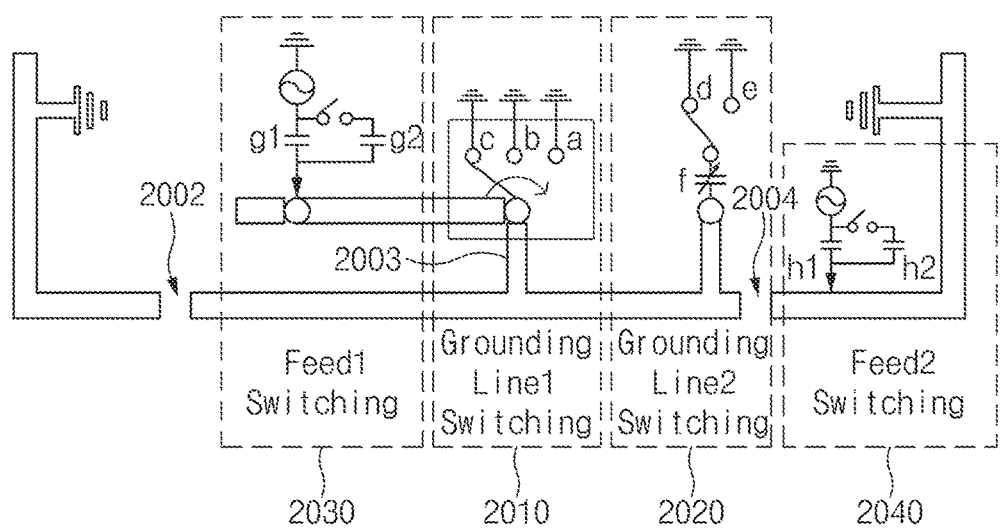
FIG. 20B is a view illustrating an antenna, characteristics of which may be changed through switching, when the antenna uses an elongated metal member including a slit as a radiator according to various embodiments of the present disclosure.

FIG. 20B is a view illustrating an antenna, characteristics of which may be changed through switching, when the antenna uses a metal member including a slit as a radiator according to various embodiments of the present disclosure. Because the electronic device of FIG. 20A and the electronic device of FIG. 20B may be the same or similar, the corresponding configurations thereof have the same reference numerals.

Referring to FIG. 20B, the first ground part 2010 and the first feeder 2030 may be connected to one extension 2003 that extends from a metal member together.

Figure 20C:
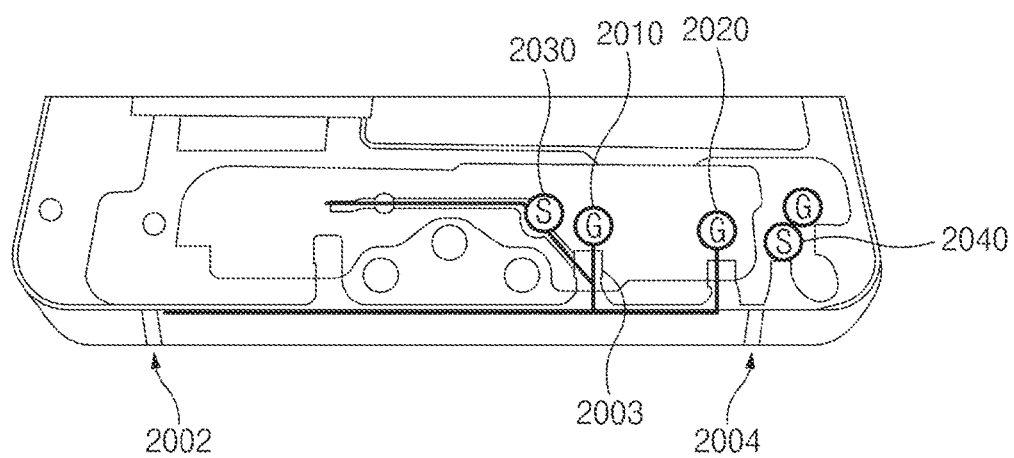
FIG. 20C is an internal arrangement view of an electronic device including the antenna of FIG. 20B according to various embodiments of the present disclosure.

FIG. 20C is an internal arrangement view of an electronic device including the antenna of FIG. 20B according to various embodiments of the present disclosure. Because the electronic device of FIG. 20B and the electronic device of FIG. 20C correspond to each other, the corresponding configurations thereof have the same reference numerals.

Referring to the first ground part 2010 and the first feeder 2030 of FIG. 20C, the first ground part 2010 and the first feeder 2030 may be connected to an extension 2003 that extends from a metal member of the electronic device to a printed circuit board together.

Figure 20D:
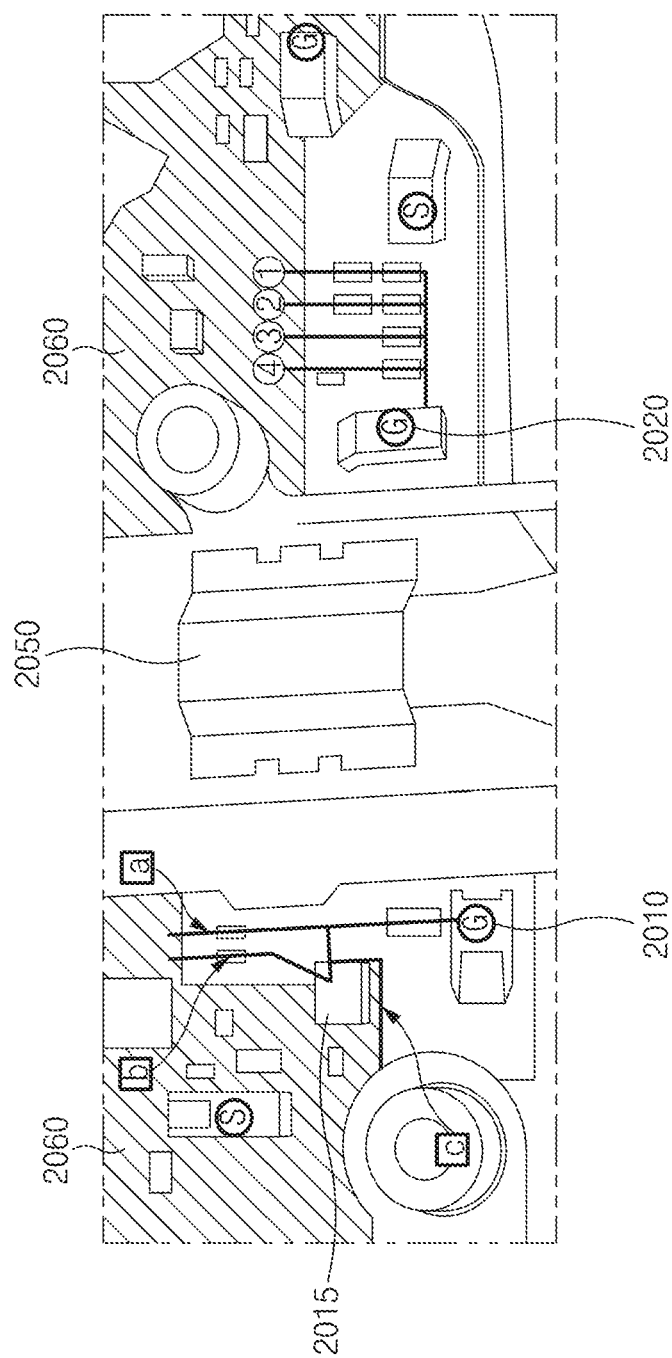
FIG. 20D is an internal arrangement view of an electronic device including the antenna of FIG. 20A according to various embodiments of the present disclosure.

FIG. 20D is an internal arrangement view of an electronic device including the antenna of FIG. 20A according to various embodiments of the present disclosure. Because the electronic device of FIG. 20A and the electronic device of FIG. 20D correspond to each other, the corresponding configurations thereof have the same reference numerals. Referring to FIG. 20D, the first ground part 2010 and the second ground part 2020 may be connected to a ground area 2060 through one of paths a to c, and one of paths 1 to 4 to be grounded.

A circuit on the left side of the ear jack 2050 in FIG. 20D may be a switching circuit for the first ground part 2010, and a circuit on the right side of the ear jack 2050 may be a switching circuit for the second ground part 2020. Further, as can be seen in FIG. 20D, the ear jack 2050 may be disposed between the first ground part 2010 and the second ground part 2020 to minimize an influence of the earphone inserted into the ear jack 2050 on the performance of the antenna.

Figure 21:
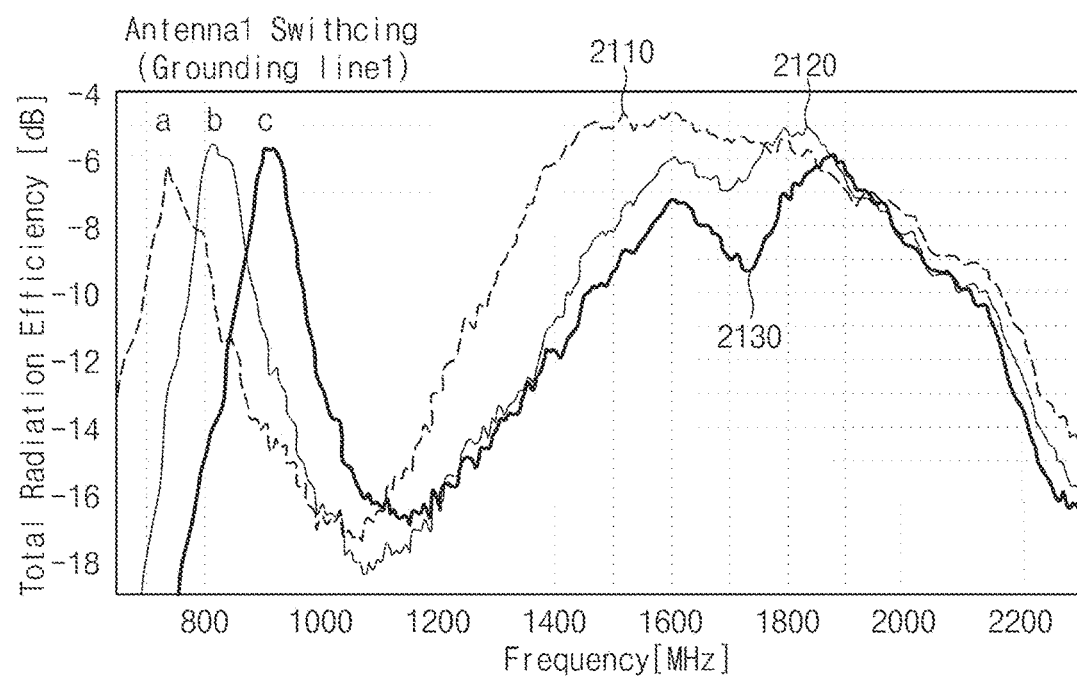
FIG. 21 is a graph illustrating characteristics of an antenna based on switching of a first ground part of FIGS. 20A to 20D according to various embodiments of the present disclosure.

According to an embodiment, referring to the first ground part 2010, a switching circuit IC 2015 may switch a path of the first ground part 2010 to any one of a path a, a path b, and a path c. Because the lengths of the path a, the path b, and the path c are different, the resonance frequency of the antenna may be tuned through the switching operation. The change in the characteristics of the antenna due to the switching operation is illustrated in FIG. 21.

According to an embodiment, a switching circuit IC 2015, for example, may receive a command from a CP and perform a switching operation according to the command. Further, the switching circuit IC 2015 may receive information on a current communication state from the CP, and may determine and switch a path, which is to be connected, based on the received information by itself.

According to various embodiments of the present disclosure, before the switching operation, the first ground part 2010 may be connected to the path basically. For example, because the length of the radiator in this case is longest, the antenna may have a resonance frequency at the lowest low band as in FIG. 21, and when the path is switched to the path b or the path c, the antenna may have a resonance frequency at a rather high low band.

According to an embodiment, referring to the second ground part 2020, the second ground part 2020 may be switched to any one of the path 1, the path 2, the path 3, and the path 4. The frequency of a high band antenna radiated through the second ground part 2020 and the second feeder

Figure 22:
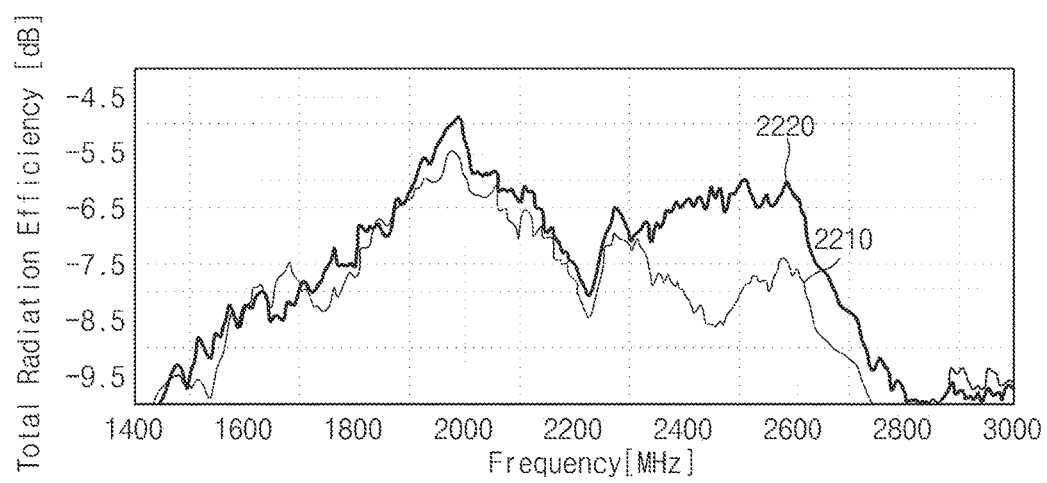
FIG. 22 is a graph illustrating characteristics of an antenna based on switching of a second ground part of FIGS. 20A to 20D according to various embodiments of the present disclosure.

2040 may be adjusted through a switching operation of the second ground part 2020. For example, because the lengths of the paths 1 to 4 are different, the resonance frequency of the antenna may be tuned through the switching operation. The change in the characteristics of the antenna due to the switching operation is illustrated in FIG. 22. FIG. 22 does not illustrate changes in the characteristics of all of the antennas for the paths 1 to 4, and illustrates changes in the characteristics of the antenna for the path 1 to 3.

According to various embodiments of the present disclosure, the second ground part 2020 may use elements positioned below the paths 1 to 4, or may use a switching circuit. Further, only a path that may be connected to the second ground part 2020 may be printed on a printed circuit board, and it may be designed such that the path may be short-circuited or properly connected by using a specific element so that the second ground part 2020 may be used for tuning during a manufacturing process of the antenna.

FIG. 21 is a graph illustrating characteristics of an antenna based on switching of a first ground part of FIG. 20 according to various embodiments of the present disclosure.

Referring to FIG. 21, a first antenna characteristic graph 2110 may represent characteristics corresponding to the case in which the path is switched to a path a at the first ground part 2010 of FIG. 20A, a second antenna characteristic graph 2120 may represent characteristics corresponding to the case in which the path is switched to a path b at the first ground part 2010 of FIGS. 20A to 20D, and a first antenna characteristic graph 2130 may represent characteristics corresponding to the case in which the path is switched to a path c at the first ground part 2010 of FIGS. 20A to 20D.

According to an embodiment, the first antenna may have a resonance frequency of 700 MHz, the second antenna may have a resonance frequency of 800 MHz, and the third antenna may have a resonance frequency of 900 MHz. That is, the electronic device may switch a band to 700 MHz, 800 MHz, and 900 MHz according to connections for the path a, the path b, and the path c.

FIG. 22 is a graph illustrating characteristics of an antenna based on switching of a second ground part of FIGS. 20A and 20B according to various embodiments of the present disclosure.

Referring to FIG. 22, a first antenna characteristic graph 2210 may represent characteristics corresponding to the case in which the second ground part 2020 of FIGS. 20A and 20B switches the path to a path d, and a second antenna characteristic graph 2220 may represent characteristics corresponding to the case in which the second ground part 2020 of FIGS. 20A and 20B switches the path to a path e.

According to an embodiment, the electronic device may switch a band through switching of the path to a path d or a path e.

Figure 23:
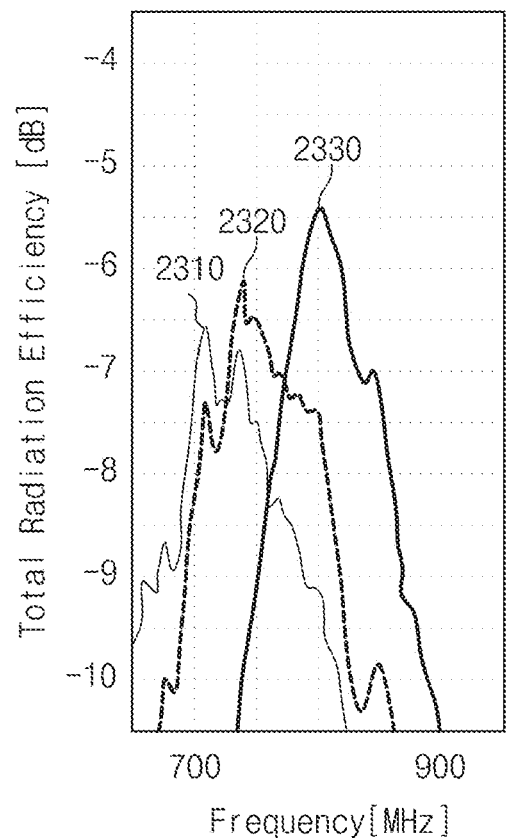
FIG. 23 is a graph illustrating characteristics of an antenna based on capacitances of a variable capacitor connected to the second ground part of FIGS. 20A to 20D according to various embodiments of the present disclosure.

FIG. 23 is a graph illustrating characteristics of an antenna based on capacitances of a variable capacitor connected to the second ground part of FIGS. 20A to 20B according to various embodiments of the present disclosure.

Referring to FIG. 23, a first antenna characteristic graph 2310 represents characteristics corresponding to the case in which the capacitance of a variable capacitor connected to the second ground part 2020 of FIGS. 20A to 20D is tuned to about 33 pF, a second antenna characteristic graph 2320 represents characteristics corresponding to the case in which the capacitance of the variable capacitor is tuned to about 12 pF, and a third antenna characteristic graph 2330 represents characteristics corresponding to the case in which the capacitance of the variable capacitor is tuned to about 4.7 pF.

According to an embodiment, the electronic device may switch a band by changing the capacitance of the capacitor. As the capacitance value becomes smaller, the supported frequency band may become higher. The electronic device may be finely tuned to a low frequency band of 700 MHz according to the capacitance value. Although not illustrated in FIG. 23, the performances of the antennas of a mid frequency band and a high frequency band also may be maintained in the same way.

Referring to FIG. 20A, a metal member of the electronic device may be separated by a first slit 2002 and a second slit 2004. If an object having a high dielectric coefficient and a big loss contacts the first slit 2002 or the slit 2004, the capacitance of a capacitor corresponding to the first slit 2002 or the second slit 2004 may change, and thus the resonance frequency of the antenna also may change. The object having a high dielectric coefficient and a big loss may be a hand of the user, and a phenomenon in which a resonance frequency changes as the hand of the user contacts the first slit 2002 or the second slit 2004 is called a death grip phenomenon. The change in the resonance frequency of the antenna due to the death grip phenomenon is an unintended change, and may cause a problem of deteriorating communication yield rate.

According to an embodiment, in order to reduce a change in the resonance frequency due to the death grip phenomenon, the electronic device may adjust (switching of a frequency band is possible) the resonance frequency by using switching of the first ground part 2010, the second ground part 2020, the first feeder 2030, and the second feeder 2040. For example, the CP of the electronic device may order a switching command to at least one of the first ground part 2010, the second ground part 2020, the first feeder 2030, and the second feeder 2040 to compensate for the resonance frequency shifted due to the death grip phenomenon.

A change in resonance frequency due to the death grip phenomenon and frequency compensating effect through the switching operation will be described with reference to FIG. 24.

Figure 24:
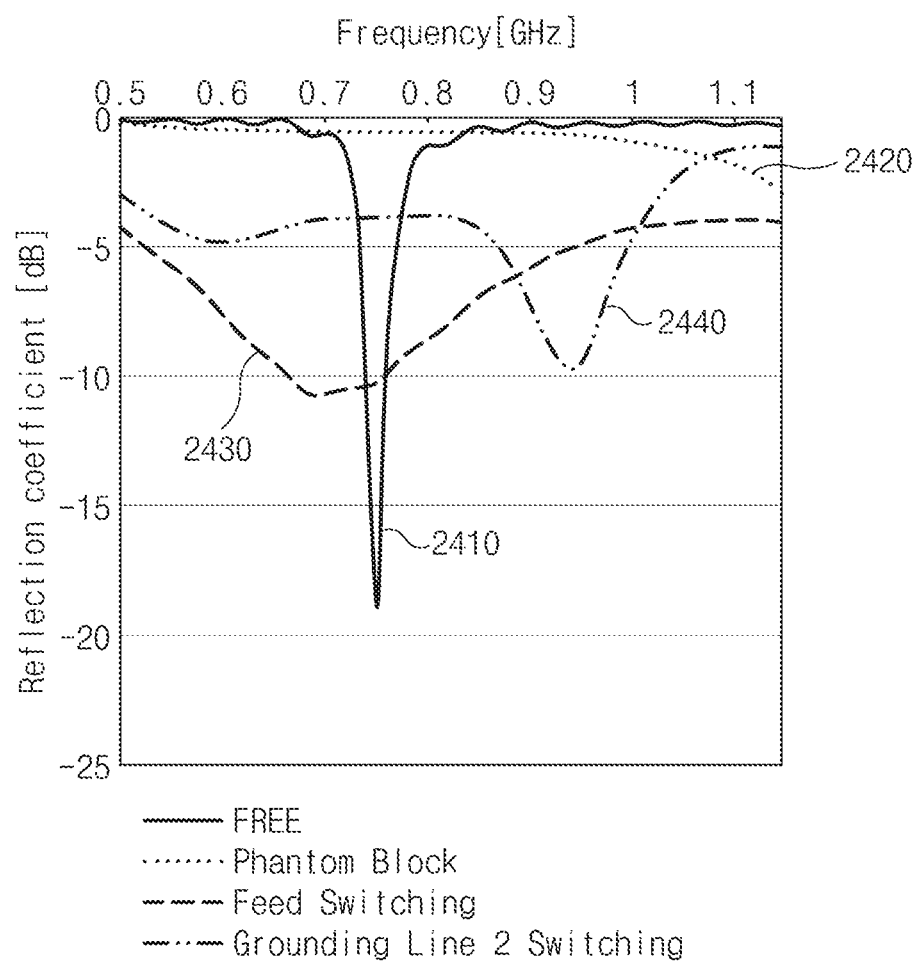
FIG. 24 is a view illustrating an antenna characteristic graph before and after an external object contacts a slit that segments an elongated metal member of an electronic device and an antenna characteristic graph improved through switching according to various embodiments of the present disclosure.

FIG. 24 is a view illustrating an antenna characteristic graph before and after an external object contacts a slit that segments a metal member of an electronic device and an antenna characteristic graph improved through switching according to various embodiments of the present disclosure.

Referring to FIG. 24, an antenna characteristic graph 2410 is a graph representing characteristics (characteristics of an antenna in consideration of both the first antenna and the second antenna of FIGS. 20A to 20D) of an antenna of the electronic device before a death grip phenomenon occurs. An antenna characteristic graph 2420 is a graph representing characteristics of an antenna of the electronic device corresponding to the case in which the death grip phenomenon occurs.

When the antenna characteristic graphs 2410 and 2420 are compared, the entire resonance frequency is shifted to a lower frequency if an external object (for example, a hand of the user) contacts a slit. Referring to the antenna characteristic graph 2420, the radiation performance of the antenna may deteriorate due to the shift of the resonance frequency, and in particularly, the performance of the antenna may severely deteriorate at a low frequency band of 750 MHz.

An antenna characteristic graph 2430 is a graph corresponding to the case in which the first feeder 2010 of FIGS. 20A to 20D performs a switching operation, and an antenna characteristic graph 2440 is a graph corresponding to the case in which the second ground part 2010 performs a switching operation and/or adjust capacitance.

When the antenna characteristic graph 2430 and the antenna characteristic graph 2440 are compared with the antenna characteristic graph 2420, it can be seen that the yield rate of the antenna is recovered at a band of 750 MHz.

Figure 25:
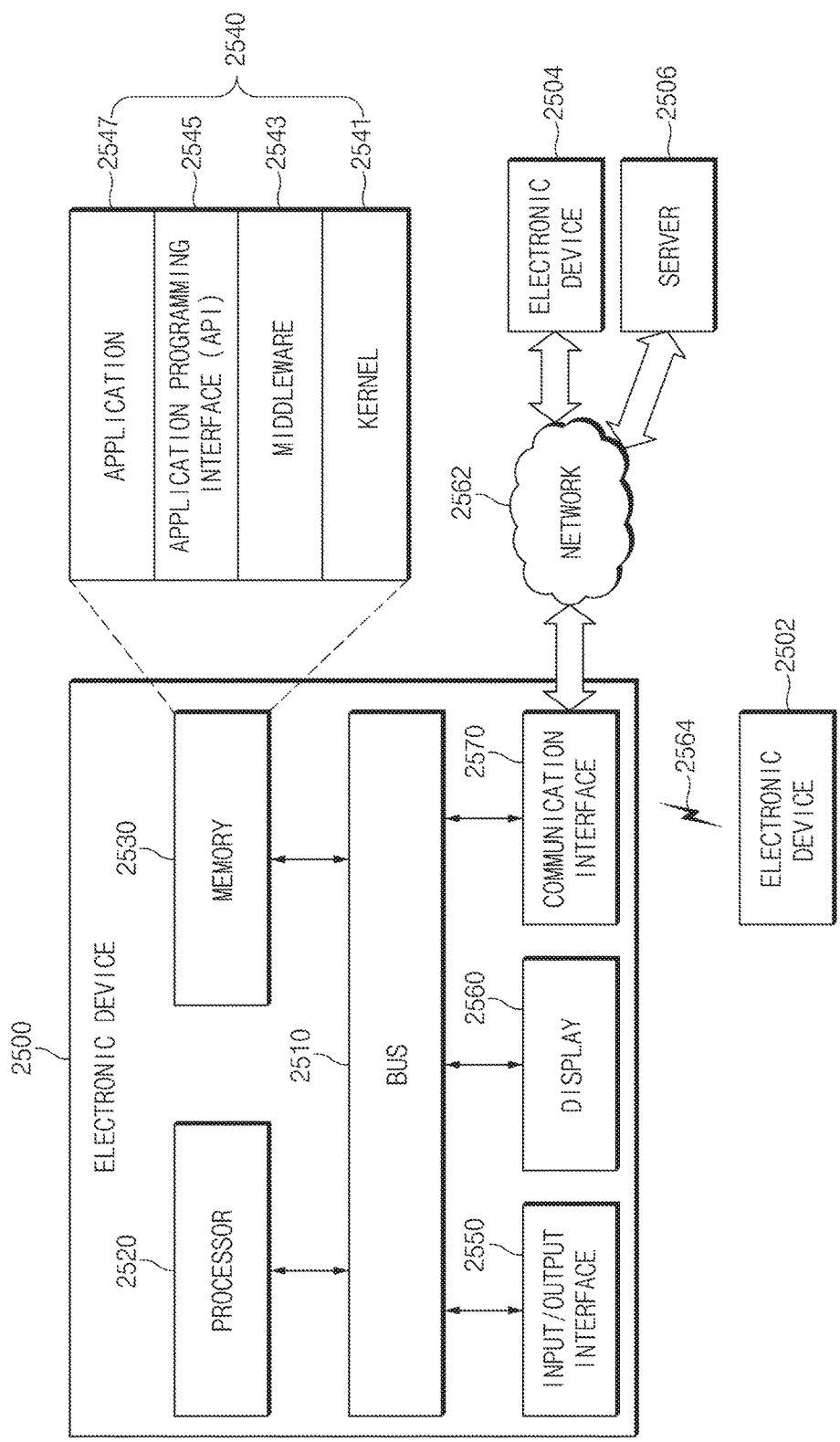
FIG. 25 is a view illustrating an electronic device in a network environment according to various embodiments of the present disclosure.

Referring to FIG. 25, an electronic device 2500 in a network environment according to various embodiments will be described. The electronic device 2500 may include a bus 2510, a processor 2520, a memory 2530, an input/output interface 2550, a display 2560, and a communication interface 2570. In some embodiments, the electronic device 2500 may exclude at least one of the elements or may additionally include another element.

The bus 2510, for example, may include a circuit that connects the elements 2510 to 2570 and transfers communications (for example, control messages and/or data) between the elements.

The processor 2520 may include one or more of a CPU, an AP, or a CP. The processor 2520, for example, may execute operations or data processing related to the control and/or communication of at least one other element of the electronic device 2500.

The memory 2530 may include a volatile and/or nonvolatile memory. The memory 2530, for example, may store commands or data related to at least one other element of the electronic device 2500. According to an embodiment, the memory 2530 may store software and/or a program 2540. The program 2540, for example, may include a kernel 2541, middleware 2543, an application programming interface (API) 2545, and/or an application program (or an application) 2547. At least some of the kernel 2541, the middleware 2543, or the API 2545 may be referred to as an operating system (OS).

The kernel 2541, for example, may control or manage system resources (for example, the bus 2510, the processor 2520, and the memory 2530) that are used to execute operations or functions implemented in the other programs (for example, the middleware 2543, the API 2545, or the applications 2547). The kernel 2541 may provide an interface through which the middleware 2543, the API 2545, or the applications 2547 access individual elements of the electronic device 2500 to control or manage the system resources.

The middleware 2543, for example, may function as an intermediary that allows the API 2545 or the applications 2547 to communicate with the kernel 2541 to exchange data.

The middleware 2543 may process one or more work requests received from the application programs 2547, according to their priorities. For example, the middleware 2543 may give a priority, by which a system resource (for example, the bus 2510, the processor 2520, or the memory 2530) of the electronic device 2500 may be used, to at least one of the application programs 2547. For example, the middleware 2543 may perform scheduling or load balancing for the one or more work requests by processing the one or more work requests according to the priority given to the at least one of the application programs 1047.

The API 2545 is an interface used, by the application 2547, to control a function provided by the kernel 2541 or the middleware 2543, and may include, for example, at least one interface or function (for example, an instruction), for example, for file control, window control, image processing, and text control.

The input/output interface 2550, for example, may function as an interface that may transfer commands or data that are input from the user or another external device to another element(s) of the electronic device 2500. The input/output interface 2550 may output commands or data received from another element(s) of the electronic device to the user or anther external device 2500.

The display circuit 2560, for example, may include a liquid crystal display (LCD), a light emitting diode (LED) display, an organic light emitting diode (OLED) display, a microelectromechanical system (MEMS) display, or an electronic paper display. The display circuit 2560, for example, may display various contents (for example, a text, an image, a video, an icon, and a symbol). The display circuit 2560 may include a touch screen and receive, for example, a touch, a gesture, a proximity, or a hovering input using an electronic pen or the user's body.

The communication circuit 2570, for example, may set communication between the electronic device 2500 and an external device (for example, a first external electronic device 2502, a second external electronic device 2504, or a server 2506). For example, the communication circuit 2570 may be connected to a network 2562 through a wireless communication or a wired communication to communicate with the external device (for example, the second external electronic device 2504 or the server 2506).

The wireless communication is, for example, a cellular communication protocol, and, for example, may use at least one of long-term evolution (LTE), LTE-advanced (LTE-A), code division multiple access (CDMA), wideband CDMA (WCDMA), a universal mobile telecommunications system (UMTS), wireless broadband (WiBro), or a global system for mobile communications (GSM).

Furthermore, the wireless communication, for example, may include a short range communication 2564. The short range communication 2564, for example, may include at least one of Wi-Fi, Bluetooth (BT), a near field communication (NFC), or a global navigation satellite system (GNSS). The GNSS may include at least one of, for example, a global positioning system (GPS), a global navigation satellite system (Glonass), a Beidou navigation satellite system (hereinafter, "Beidou"), or the European global satellite-based navigation system (Galileo), according to an in-use area or a bandwidth. Hereinafter, in the present disclosure, the "GPS" may be interchangeably used with the "GNSS." The wired communication may include at least one of, for example, a universal serial bus (USB), a high definition multimedia interface (HDMI), recommended standard-232 (RS-232), and a plain old telephone Service (POTS). The network 2562 may include at least one of communication networks, for example, a computer network (for example, a local area network (LAN) or a wide area network (WAN)), the Internet, or a telephone network.

The first and second external electronic devices 2502 and 2504 may be the same or different type devices from the electronic device 2500. According to an embodiment, the server 2506 may include a group of one or more servers. According to various embodiments of the present disclosure, all or some of the operations executed by the electronic device 2500 may be executed by another or a plurality of electronic devices (for example, the first external electronic device 2502, the second external electronic device 2504, or the server 2506). According to an embodiment of the present disclosure, when the electronic device 2500 should execute some functions or services automatically or upon request, the electronic device 2500 may request at least some functions associated with the functions or services from another electronic device (for example, the first external electronic device 2502, the second external electronic device 2504, or the server 2506), in place of or in addition to directly executing the functions or services. The other electronic device (for example, the first external electronic device 2502, the second external electronic device 2504, or the server 2506) may execute a requested function or an additional function, and may transfer the result to the electronic device 2500. The electronic device 2500 may process the received result directly or additionally, and may provide a requested function or service. To this end, for example, the cloud computing, distributed computing, or client-server computing technologies may be used.

Figure 26:
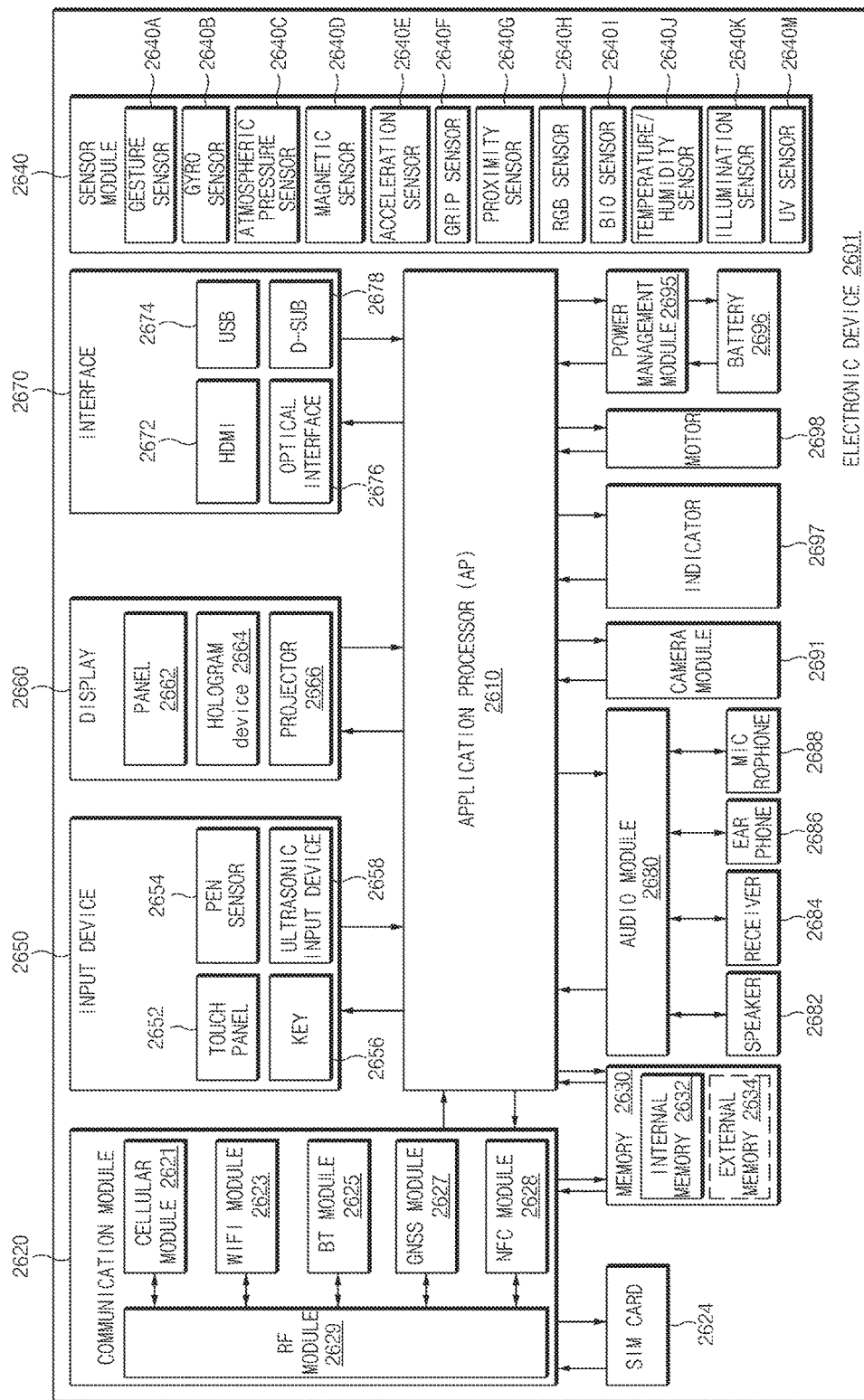
FIG. 26 is a block diagram of an electronic device according to various embodiments of the present disclosure.

FIG. 26 is a block diagram of an electronic device 2600 according to various embodiments. An electronic device 2600 may include, for example, the entirety or a part of the electronic device 2500 illustrated in FIG. 25. Referring to FIG. 26, the electronic device 2600 may include at least one processor (for example, an AP 2610), a communication module 2620, a subscriber identification module (SIM) card 2624, a memory 2630, a sensor module 2640, an input device 2650, a display 2660, an interface 2670, an audio module 2680, a camera module 2691, a power management module 2695, a battery 2696, an indicator 2697, or a motor 2698.

The processor 2610 may control a plurality of hardware or software elements connected to the processor 2610 by driving an OS or an application program and perform a variety of data processing and calculations. The processor 2610 may be implemented by, for example, a system on chip (SoC). According to an embodiment, the processor 2610 may further include a graphical processing unit (GPU) and/or an image signal processor. The processor 2610 may include at least some (for example, a cellular module 2621) of the elements illustrated in FIG. 26. The processor 2610 may load instructions or data, received from at least one other element (for example, a non-volatile memory), in a volatile memory to process the loaded instructions or data, and may store various types of data in a non-volatile memory.

The communication circuit 2620 may have the same or similar structure to the communication circuit 2570 of FIG. 25. The communication circuit 2620 may include, for example, a cellular module 2621, a Wi-Fi module 2623, a Bluetooth module 2625, a GNSS module 2627 (for example, a GPS module, a Glonass module, a Beidou module, or a Galileo module), an NFC module 2628, and a radio frequency (RF) module 2629.

The cellular module 2621 may provide a voice call, a video call, a text message service, or an Internet service through, for example, a communication network. According to an embodiment, the cellular module 2621 may distinguish between and authenticate electronic devices 2600 within a communication network using a SIM (for example, the SIM card 2624). According to an embodiment, the cellular module 2621 may perform at least some of the functions that the processor 2610 may provide. According to an embodiment of the present disclosure, the cellular module 2621 may include a CP.

The Wi-Fi module 2623, the BT module 2625, the GPS module 2627, and the NFC module 2628 may include a processor for processing data transmitted/received through the corresponding module. According to some embodiments, at least some (two or more) of the cellular module 2621, the Wi-Fi module 2623, the Bluetooth module 2625, the GNSS module 2627, and the NFC module 2628 may be included in one integrated chip (IC) or IC package.

The RF module 2629 may transmit/receive, for example, a communication signal (for example, an RF signal). The RF module 2629 may include, for example, a transceiver, a power amp module (PAM), a frequency filter, a low noise amplifier (LNA), or an antenna. According to another embodiment, at least one of the cellular module 2621, the Wi-Fi module 2623, the BT module 2625, the GNSS module 2627, or the NFC module 2628 may transmit and receive an RF signal through a separate RF module.

The SIM 2624 may include, for example, a card including a SIM and/or an embedded SIM, and may further include unique identification information (for example, an integrated circuit card identifier (ICCID)) or subscriber information (for example, international mobile subscriber identity (IMSI)).

The memory 2630 (for example, the memory 2530) may include, for example, an internal memory 2632 or an external memory 2634. The internal memory 2632 may include at least one of, for example, a volatile memory (for example, a dynamic random access memory (DRAM), a static RAM (SRAM), a synchronous dynamic RAM (SDRAM), and the like) and a non-volatile memory (for example, a one-time programmable read only memory (OTPROM), a programmable ROM (PROM), an erasable and programmable ROM (EPROM), an electrically erasable and programmable ROM (EEPROM), a flash memory (for example, a NAND flash memory or a NOR flash memory), a hard driver, or a solid state drive (SSD).

The external memory 2634 may further include a flash drive, for example, a compact flash (CF), a secure digital (SD), a micro-SD), a mini-SD), an eXtreme Digital (xD), or a memory stick. The external memory 2634 may be functionally and/or physically connected to the electronic device 2600 through various interfaces.

The sensor circuit 2640 may measure, for example, a physical quantity or detect an operation state of the electronic device 2600, and may convert the measured or detected information to an electrical signal. The sensor circuit 2640 may include at least one of, for example, a gesture sensor 2640A, a gyro sensor 2640B, an atmospheric pressure sensor 2640C, a magnetic sensor 2640D, an acceleration sensor 2640E, a grip sensor 2640F, a proximity sensor 2640G, a color sensor 2640H (for example, red, green, and blue (RGB) sensor), a biometric sensor (bio sensor) 26401, a temperature/humidity sensor 2640J, an illumination sensor 2640K, and a ultra violet (UV) sensor 2640M. Additionally or alternatively, the sensor circuit 2640 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor circuit 2640 may further include a control circuit for controlling one or more sensors included therein. In some embodiments, the electronic device 2600 may further include a processor configured to control the sensor circuit 2640 as a part of or separately from the processor 2610, and may control the sensor circuit 2640 while the processor 2610 is in a sleep state.

The input device 2650 may include, for example, a touch panel 2652, a (digital) pen sensor 2654, a key 2656, or an ultrasonic input device 2658. The touch panel 2652 may use at least one of, for example, a capacitive type, a resistive type, an IR type, and an ultrasonic type. The touch panel 2652 may further include a control circuit. The touch panel 2652 may further include a tactile layer, and provide a tactile reaction to a user.

The (digital) pen sensor 2654 may include, for example, a recognition sheet which is a part of the touch panel or a separate recognition sheet. The key 2656 may include, for example, a physical button, an optical key, or a keypad. The ultrasonic input device 2658 may detect ultrasonic waves generated by an input tool through a microphone (for example, a microphone 2688) and may identify data corresponding to the detected ultrasonic waves.

The display circuit 2660 (for example, the display circuit 2560) may include a panel 2662, a hologram device 2664, or a projector 2666. The panel 2662 may include an element equal or similar to the display circuit 2560 of FIG. 25. The panel 2662 may be implemented to be, for example, flexible, transparent, or wearable. The panel 2662 may be formed as a single module together with the touch panel 2652. The hologram device 2664 may show a three dimensional image in the air using an interference of light. The projector 2666 may display an image by projecting light onto a screen. The screen may be located, for example, in the interior of or on the exterior of the electronic device 2600. According to an embodiment, the display circuit 2660 may further include a control circuit for controlling the panel 2662, the hologram device 2664, or the projector 2666.

The interface 2670 may include, for example, an HDMI 2672, a USB 2674, an optical interface 2676, or a D-subminiature (D-sub) 2678. The interface 2670 may be included in, for example, the input/output interface 2550 illustrated in FIG. 25. Additionally or alternatively, the interface 2670 may include, for example, a mobile high-definition link (MHL) interface, an SD card/multi-media card (MMC) interface, or an infrared data association (IrDA) standard interface.

The audio module 2680 may bilaterally convert, for example, a sound and an electrical signal. At least some elements of the audio module 2680 may be included in, for example, the input/output interface 2550 illustrated in FIG. 25. The audio module 2680 may process voice information input or output through, for example, a speaker 2682, a receiver 2684, earphones 2686, or the microphone 2688.

The camera module 2691 is a device which may photograph a still image and a dynamic image. According to an embodiment, the camera module 291 may include one or more image sensors (for example, a front sensor or a back sensor), a lens, an image signal processor (ISP) or a flash (for example, an LED or xenon lamp).

The power management module 2695 may manage, for example, power of the electronic device 2600. According to an embodiment of the present disclosure, the power management module 2695 may include a power management integrated circuit (PMIC), a charger integrated circuit (IC), or a battery or fuel gauge. The PMIC may have a wired and/or wireless charging scheme. Examples of the wireless charging method may include, for example, a magnetic resonance method, a magnetic induction method, an electromagnetic wave method, and the like. Additional circuits (for example, a coil loop, a resonance circuit, a rectifier, etc.) for wireless charging may be further included. The battery gauge may measure, for example, a residual quantity of the battery 2696, and a voltage, a current, or a temperature while charging. The battery 2696 may include, for example, a rechargeable battery and/or a solar battery.

The indicator 2697 may indicate particular status of the electronic device 2600 or a part thereof (for example, the processor 2610), for example, a booting status, a message status, a charging status, or the like. The motor 2698 may convert an electrical signal into mechanical vibrations, and may generate a vibration or haptic effect. Although not illustrated, the electronic device 2600 may include a processing device (for example, a GPU) for supporting mobile TV. The processing unit for supporting mobile TV may process, for example, media data pursuant to a certain standard of digital multimedia broadcasting (DMB), digital video broadcasting (DVB), or media flow (mediaFlo™).

Each of the elements described in the specification may include one or more components, and the terms of the elements may be changed according to the type of the electronic device. In various embodiments of the present disclosure, the electronic device may include at least one of the elements described in the specification, and some elements may be omitted or additional elements may be further included. Some of the elements of the electronic device according to various embodiments may be coupled to form one entity, and may perform the same functions of the corresponding elements before they are coupled.

Figure 27:
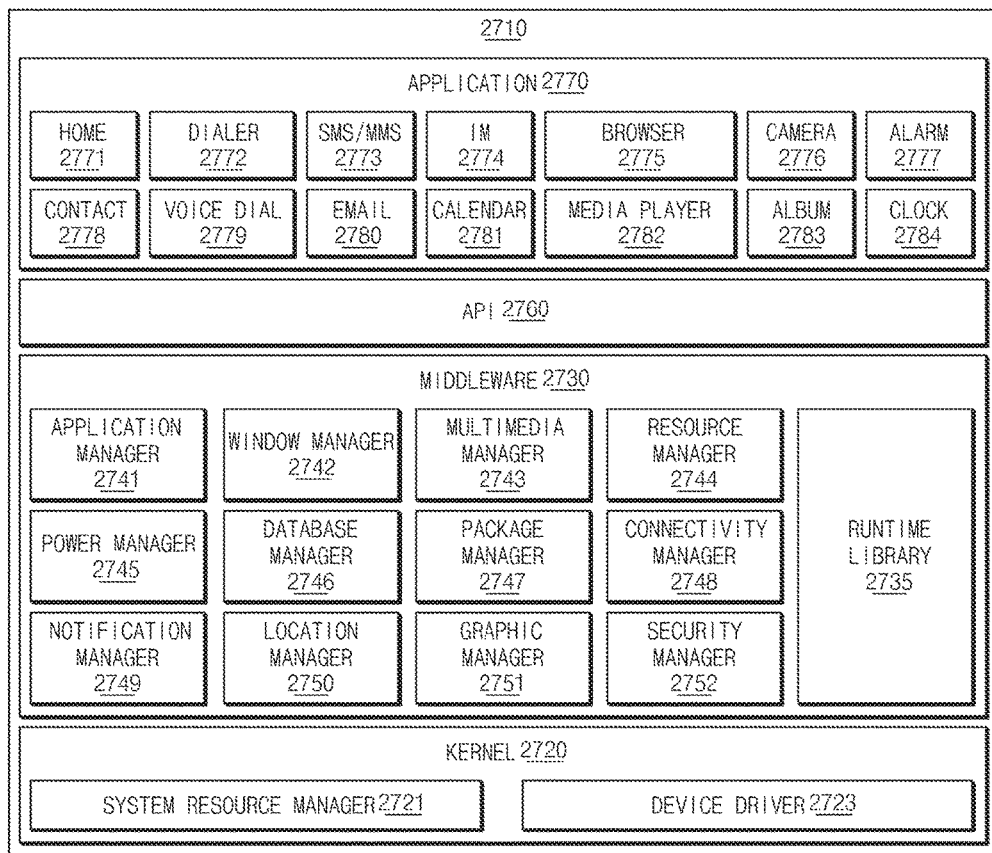
FIG. 27 is a block diagram of a program module according to various embodiments of the present disclosure.

FIG. 27 is a block diagram of a program module according to various embodiments. According to an embodiment, the program module 2710 (for example, a program 2540) may include an OS that controls resources related to an electronic device 2500, and various application programs (for example, an application program 2547) that is driven on an OS. The OS may be, for example, Android, iOS, Windows, Symbian, Tizen, Bada, or the like.

Referring to FIG. 27, the program module 2710 may include a kernel 2720, a middleware 2730, an API 2760, and/or applications 2770. At least a part of the program module 2710 may be preloaded on an electronic device or may be downloaded from external electronic devices (for example, first and second external electronic devices 2502 and 2504 and a server 2506).

The kernel 2720 (for example, the kernel 2541) may include, for example, a system resource manager 2721 and/or a device driver 2723. The system resource manager 2721 may control, allocate, or retrieve the system resources. According to one embodiment, the system resource manager 2721 may include a process management unit, a memory management unit, or a file system management unit. The device driver 2723 may include, for example, a display driver, a camera driver, a Bluetooth driver, a shared-memory driver, a USB driver, a keypad driver, a Wi-Fi driver, an audio driver, or an inter-process communication (IPC) driver.

The middleware 2730 may provide a function required by the applications 870 in common or provide various functions to the applications 2770 through the API 2760 so that the applications 2770 can efficiently use limited system resources of the electronic device. According to an embodiment, the middleware 2730 (for example, the middleware 2543) may include, for example, at least one of a runtime library 2735, an application manager 2741, a window manager 2742, a multimedia manager 2743, a resource manager 2744, a power manager 2745, a database manager 2746, a package manager 2747, a connectivity manager 2748, a notification manager 2749, a location manager 2750, a graphic manager 2751, and a security manager 2752.

The run time library 2735 may include, for example, a library module that a compiler uses in order to add new functions through a programming language while the applications 2770 are executed. The run time library 2735 may perform input/output management, memory management, or a function for an arithmetic function.

The application manager 2741, for example, may manage a lifecycle of at least one of the applications 2770. The window manager 2742 may manage a GUI resource used in a screen. The multimedia manager 2743 may detect a format required for reproducing various media files and encode or decode a media file using a codec appropriate for the corresponding format. The resource manager 2744 may manage resources, such as a source code, a memory, or a storage space, of at least one of the applications 2770.

The power manager 2745 may operate together with, for example, a basic input/output system (BIOS), so as to manage a battery or power and may provide power information required for the operation of the electronic device. The database manager 2746 may generate, search for, or change a database to be used by at least one of the applications 2770. The package manager 2747 may manage the installation or the updating of applications distributed in a package file form.

For example, the connectivity manager 2748 may manage wireless connections, such as Wi-Fi or Bluetooth. The notification manager 2749 may display or notify an event such as a received message, an appointment, a proximity notification, and the like to a user without disturbance. The location manager 2750 may manage location information of the electronic device. The graphic manager 2751 may manage graphic effects to be provided to a user and user interfaces related to the graphic effects. The security manager 2752 may provide various security functions required for system security or user authentication. According to an embodiment of the present disclosure, when the electronic device (for example, the electronic device 2500) has a phone function, the middleware 2730 may further include a telephony manager for managing a voice or video communication function of the electronic device.

The middleware 2730 may include a middleware module for forming a combination of various functions of the aforementioned elements. The middleware 2730 may provide modules specialized according to the type of OS in order to provide differentiated functions. In addition, some existing elements may be dynamically removed from the middleware 2730, or new elements may be added to the middleware 230.

The API 2760 (for example, the API 2545) is, for example, a set of API programming functions, and may be provided another configuration according to an OS. For example, for each platform, one API set may be provided in a case of Android or iOS, and two or more API sets may be provided in a case of Tizen.

The application 2770 (for example, the application program 2547) may include, for example, a home 2771, a dialer 2772, an SMS/MMS 2773, an instant messenger (IM) 2774, a browser 2775, a camera 2776, an alarm 2777, a contact 2778, a voice dial 2779, an e-mail 2780, a calendar 2781, a media player 2782, an album 2783, a clock 2784, or at least one application that may provide health care (for example, measuring an exercise degree or blood glycose) or environmental information.

According to an embodiment, the application 2770 may include an application (hereinafter, referred to as "an information exchange application for convenience of description) that supports exchange of information between the electronic device (for example, the electronic device 2500) and other electronic devices (for example, the first external electronic device 2502 and the second external electronic device 2504). The information exchange application may include, for example, a notification relay application for forwarding specific information to an external electronic device, or a device management application for managing an external electronic device.

For example, the notification relay application may have a function of forwarding, to other electronic devices (for example, the first electronic device 2502 and the second electronic device 2504), notification information generated from other applications of the electronic device 10 (for example, an short message service (SMS)/multi-media message service (MMS) application, an e-mail application, a health care application, and an environmental information application). The notification relay application may receive notification information from, for example, an external electronic device and provide the received notification information to a user.

The device management application may, for example, manage (for example, install, delete, or update) a function for at least a part of an external electronic device (for example, the first electronic device 2502 and the second electronic device 2504) communicating with the electronic device 100 (for example, activating/deactivating the external electronic device itself (or some components thereof) or adjusting the brightness (or resolution) of a display), an application operating in the external electronic device, or a service provided from the external electronic device (for example, a telephone call service or a message service).

According to an embodiment, the application 2770 may include an application (for example, a health management application) designated according to an attribute of another device (for example, the first electronic device 2502 and the second electronic device 2504). According to an embodiment, the application 2770 may include an application that is received from an external electronic device (for example, the first electronic device 2502, the second electronic device 2504, or the server 2506). According to an embodiment of the present disclosure, the applications 2770 may include a preloaded application or a third party application that is downloaded from a server. The names of the elements of the program module 2710 according to the illustrated embodiment may vary according to the type of the OS.

According to various embodiments, at least a part of the program module 2710 may be implemented by software, firmware, hardware, or two or more combinations thereof. At least a part of the program module 2710, for example, may be implemented (for example, executed) by a processor (for example, the processor 2610). At least a part of the program module 2710 may include, for example, a module, a program routine, a set of instructions, or a process for performing at least one function.

Figure 28A:
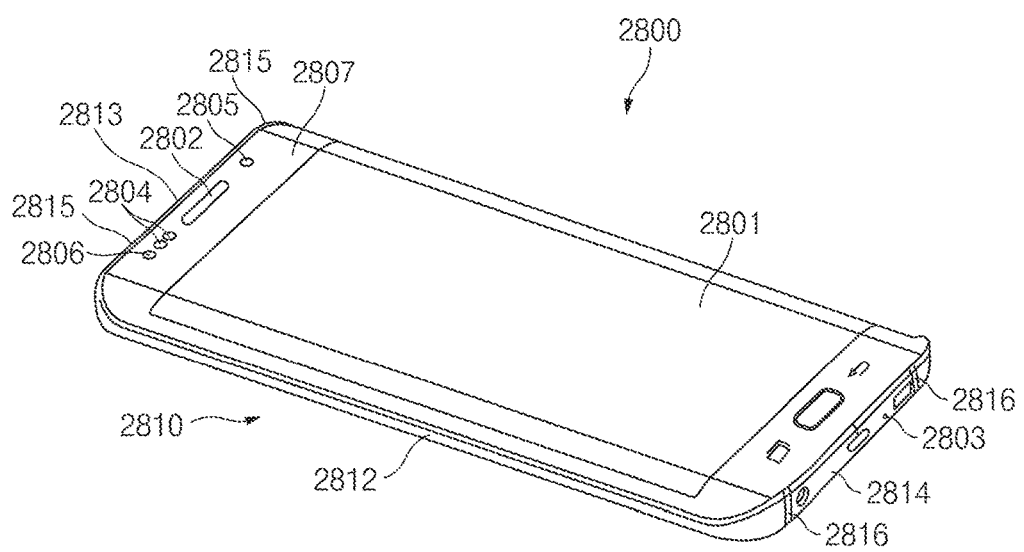
FIG. 28A is a front perspective view of an electronic device according to various embodiments of the present disclosure.

FIG. 28A is a front perspective view of an electronic device 2800 according to various embodiments of the present disclosure.

Referring to FIG. 28A, a display 2801 may be installed on a front surface 2807 of the electronic device 2800. A speaker unit 2802 for receiving a voice of a counterpart may be installed above the display 2801. A microphone unit 2803 for transmitting voice of the user of the electronic device to a counterpart may be installed below the display 2801.

According to an embodiment of the present disclosure, components for performing various functions of the electronic device 2800 may be disposed near the speaker unit 2802. The components may include one or more sensor modules 2804. The sensor module 2804 may include, for example, at least one of an illumination intensity sensor (for example, a light sensor), a proximity sensor, an IR ray sensor, or an ultrasonic wave sensor. According to an embodiment of the present disclosure, the components may include a camera unit 2805. According to one embodiment of the present disclosure, the components may include an indicator 2806 to inform the user of state information of the electronic device 2800.

According to various embodiments of the present disclosure, the electronic device 2800 may include a metal bezel 2810 (for example, may contribute as at least a portion of a metal member). According to an embodiment of the present disclosure, the metal bezel 2810 may be disposed along a periphery of the electronic device 2800 and may be disposed to extend to at least a portion of the rear surface of the electronic device 2800, which extends to the periphery of the electronic device 2800. According to an embodiment of the present disclosure, the metal bezel 2810 may define the thickness of the electronic device along the periphery of the electronic device 2800, and may be formed in the form of a loop. However, the present disclosure is not limited thereto, and the metal bezel 2810 may be formed in a manner that contributes to at least a portion of the thickness of the electronic device 2800. According to an embodiment of the present disclosure, the metal bezel 2810 may be disposed only in at a portion of the periphery of the electronic device 2800. According to an embodiment of the present disclosure, the metal bezel 2810 includes one or more segmental parts 2815 and 2816, and unit metal parts 2815 and 2816 separated by the segmental parts 2813 and 2814 may be utilized as antenna radiation bodies according to various embodiments of the present disclosure.

Figure 28B:
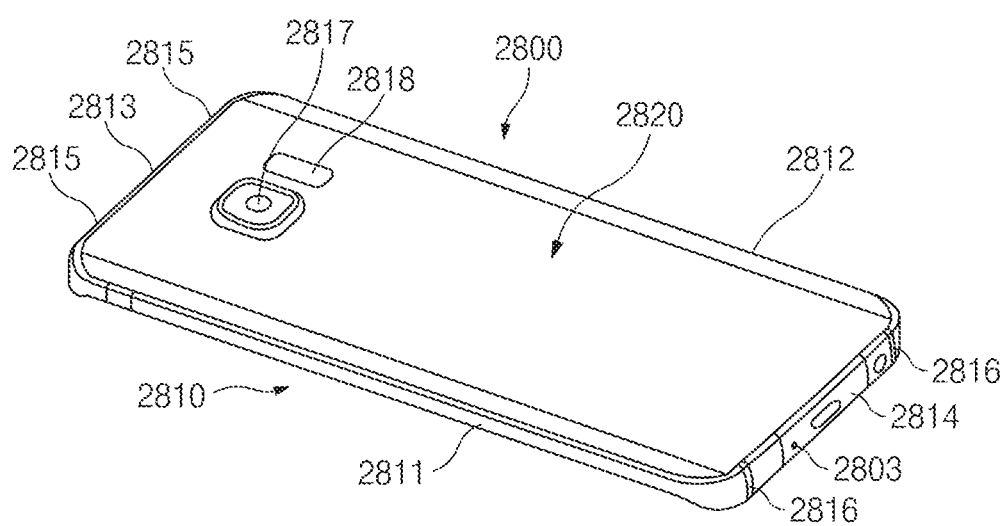
FIG. 28B is a rear perspective view of an electronic device according to various embodiments of the present disclosure.

FIG. 28B is a rear perspective view of the electronic device 2800 according to various embodiments of the present disclosure.

Referring to FIG. 28B, a cover member 2820 may be further installed on the rear surface of the electronic device 2800. The cover member 2820 may be a battery cover for protecting a battery pack detachably installed in the electronic device 2800 and making the external appearance of the electronic device 2800 appealing. However, the present disclosure is not limited thereto, but the cover member 2820 may be integrally formed with the electronic device 2800 to contribute as a rear housing of the electronic device. According to an embodiment of the present disclosure, the cover member 2820 may be formed of various materials such as a metal, glass, a composite material, or a synthetic resin. According to an embodiment of the present disclosure, a camera unit 2817 and a flash 2818 may be disposed on the rear surface of the electronic device 2800.

According to various embodiments, a lower bezel part 2814 of the metal bezel 2810 disposed to surround a periphery of the electronic device 2800, which is used as a unit bezel, may be utilized as one antenna radiator of a complex antenna according to an embodiment of the present disclosure. According to an embodiment, the lower bezel part 2814 may be disposed such that another antenna radiator disposed in the vicinity of the antenna may be coupled.

According to various embodiments of the present disclosure, the metal bezel 2810 may have a loop shape along the periphery of the electronic device 2800 and may be disposed in a manner that contributes to the entire thickness or a portion of the thickness of the electronic device 200. According to an embodiment of the present disclosure, when the electronic device 2800 is viewed from the front side, the metal bezel 2810 may have a right bezel part 2811, a left bezel part 2812, an upper bezel part 2813, and a lower bezel part 2814. Here, the above-described upper and lower bezel parts 2813 and 2814 may contribute as unit metal parts formed by the segmental parts 2815 and 2816.

Figure 28C:
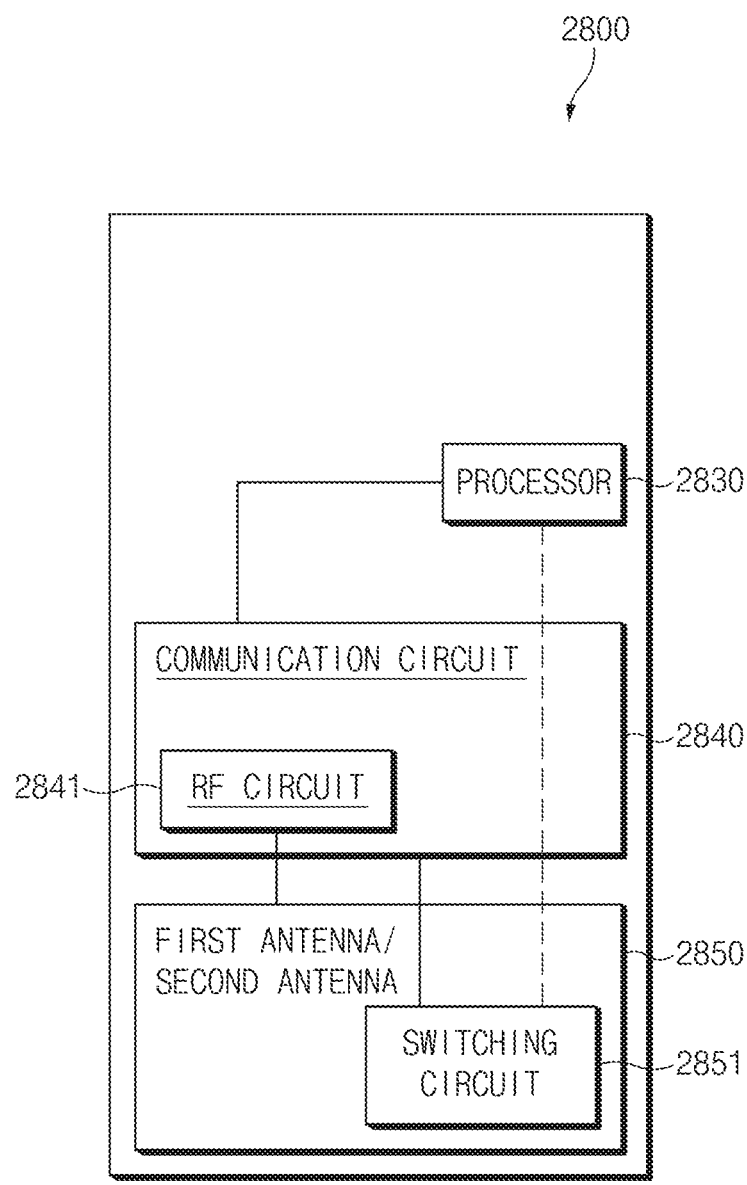
FIG. 28C is a block diagram illustrating a configuration of an electronic device for controlling an operation band of an antenna according to various embodiments of the present disclosure.

FIG. 28C is a block diagram illustrating a configuration of an electronic device for controlling an operation band of an antenna according to various embodiments of the present disclosure.

Referring to FIG. 28C, the electronic device may include a processor 2830, a communication module/circuit 2840 controlled by the processor 2830, and an antenna 2850 controlled by the processor 2830 or the communication module/circuit 2840.

According to various embodiments, the communication module/circuit 2840 may have the same or similar structure to the communication interface 2570 of FIG. 25. The communication module/circuit 2840, for example, may include a cellular module, a Wi-Fi module, a Bluetooth module, a GNSS module (for example, a GPS module, a Glonass module, a Beidou module, or a Galileo module), an NFC module, and an RF module.

According to various embodiments, the RF module/circuit 2841 may transmit/receive, for example, a communication signal (for example, an RF signal). The RF module/circuit 2841 may include, for example, a transceiver, a PAM, a frequency filter, an LNA, or an antenna.

According to various embodiments, the antenna 2850 may include at least two antenna radiators according to an embodiment of the present disclosure. The antenna 2850 may include a conductive member that is used as a part of the electronic device 2800 and is electrically connected to the RF module/circuit 2841 to be operated as a first antenna radiator. The antenna 2850 may include a conductive pattern that is disposed in the interior of the electronic device 2800 and is electrically connected to the RF module/circuit 2841 to be operated as a second antenna radiator. According to an embodiment, the antenna 2850 may include a switching circuit 2851 that is branched from an electrical path that electrically connects the communication module/circuit 2840 and the conductive member and is electrically connected to the ground member.

According to various embodiments, the antenna 2850 may change the operational frequency bands of a conductive member operated as a first antenna radiator and/or a conductive pattern operated as a second antenna radiator or expand the bandwidth of the antenna 2850 according to a switching operation of the switching circuit 2851 operated under the control of the communication module/circuit 2840 or the processor 2830.

According to various embodiments, there is provided an electronic device including a housing including a first surface, a second surface that faces an opposite side of the first surface, and a side surface that surrounds at least a portion of a space between the first surface and the second surface, a first elongated metal member that forms a portion of the side surface and includes a first end and a second end, at least one communication circuit electrically connected to a first point of the first elongated metal member through a capacitive element, at least one ground member situated in the interior of the housing, and a first conductive member that electrically connects a second point of the first elongated metal member, which is closer to the second end than the first point, to the ground member.

According to various embodiments, the first conductive member may include a conductive wire.

According to various embodiments, the first conductive member may include a metal sheet.

According to various embodiments, the electronic device may further include a second conductive member that electrically connects a third point of the first elongated metal member, which is opposite to the first point with respect to the second point, to the ground member.

According to various embodiments, the electronic device may further include a second elongated metal member that forms another portion of the side surface and that is disposed adjacent to the first end of the first elongated metal member and insulated from the first elongated metal member, and a first conductive path that electrically connects one point of the second elongated metal member to the ground member.

According to various embodiments, the electronic device may further include a third elongated metal member that forms still another portion of the side surface and that is disposed adjacent to the second end of the first elongated metal member and insulated from the first elongated metal member, and a second conductive path that electrically connects one point of the third elongated metal member to the ground member.

According to various embodiments, the at least one communication circuit may be electrically connected to a second point of the third elongated metal member.

According to various embodiments, the at least one communication circuit may be electrically connected to a third point of the third elongated metal member through a capacitive element.

According to various embodiments, the electronic device may further include a second elongated metal member that forms another portion of the side surface and that is disposed adjacent to the second end of the first elongated metal member and insulated from the first elongated metal member, and a second conductive path that electrically connects one point of the second elongated metal member to the ground member.

According to various embodiments, the at least one communication circuit may be electrically connected to a second point of the second elongated metal member.

According to various embodiments, the at least one communication circuit may be electrically connected to a third point of the second elongated metal member through a capacitive element.

According to various embodiments, the electronic device may further include a first switching circuit that selectively connects the first conductive member to at least one of a plurality of points of the ground member.

According to various embodiments, the electronic device may further include a second conductive member that electrically connects a third point of the first elongated metal member, which is opposite to the first point with respect to the second point, to the ground member, and a second switching circuit that selectively connects the second conductive member to at least one of a plurality of points of the ground member.

According to various embodiments, the electronic device may further include a second conductive member that electrically connects a third point of the first elongated metal member, which is opposite to the first point with respect to the second point, to the ground member, and a switching circuit that selectively connects the second conductive member to at least one of a plurality of points of the ground member.

According to various embodiments, there is provided an electronic device including a housing including a first surface, a second surface that faces an opposite side of the first surface, and a side surface that surrounds at least a portion of a space between the first surface and the second surface, a first elongated metal member that forms a portion of the side surface and includes a first end and a second end, at least one communication circuit electrically connected to a first point of the first elongated metal member, at least one ground member situated in the interior of the housing, a first conductive member that electrically connects a second point of the first elongated metal member, which is closer to the second end than the first point, to the ground member, and a second conductive member that electrically connects a third point of the first elongated metal member, which is closer to the second end than the second point, to the ground member.

According to various embodiments, the electronic device may further include a first switching circuit that selectively connects the first conductive member to at least one of a plurality of points of the ground member.

According to various embodiments, the electronic device may further include a second switching circuit that selectively connects the second conductive member to at least one of a plurality of points of the ground member.

According to various embodiments, the electronic device may further include a switching circuit that selectively connects the second conductive member to at least one of a plurality of points of the ground member.

According to various embodiments, the electronic device may further include a metallic input/output port between the first conductive member and the second conductive member.

According to various embodiments, there is provided an electronic device including a housing including a first surface, a second surface that faces an opposite side of the first surface, and a side surface that surrounds at least a portion of a space between the first surface and the second surface, a first elongated metal member that forms a portion of the side surface and includes a first end and a second end, at least one communication circuit electrically connected to a first point of the first elongated metal member, at least one ground member situated in the interior of the housing, and a conductive sheet that electrically connects a portion of the first elongated metal member, which is closer to the second end than the first point, to the ground member through an area contact.

According to various embodiments, the electronic device may further include a metallic input/output port at a location corresponding to the conductive sheet.

The term "module" used in the specification may mean a unit including, for example, one of hardware, software, or firmware or a combination of the two or more of them. The module may be interchangeably used, for example, with a unit, logic, a logical block, a component, or a circuit. The module may be a minimum unit or a part of an integrally configured part. The module may be a minimum unit or a part which performs one or more functions. The module may be implemented mechanically or electromagnetically. For example, the module may include at least one of an application-specific integrated circuit (ASIC) chip, a field-programmable gate array, or a programmable-logic device, which has been known, will be developed in the future, or performs certain operations.

At least some of the devices (for example, modules or functions) or methods (for example, operations) according to various embodiments of the present disclosure may be implemented by an instruction stored in a computer-readable storage medium, for example, in the form of a program module. When the instruction is executed by the processor, the at least one processor may perform a function corresponding to the instruction. The computer-readable storage medium may be, for example, a memory.

The computer-readably storage medium may include a hard disk, a floppy disk, a magnetic medium (for example, a magnetic tape), an optical medium (for example, a compact disk read only memory (CD-ROM)), a digital versatile disk (DVD), a magneto-optical medium (for example, a floptical disk), a hardware device (for example, a ROM, a RAM, or a flash memory). Further, the program instructions may include high-level language codes which may be executed by a computer using an interpreter as well as machine languages created by using a compiler. The above-mentioned hardware device may be configured to be operated as one or more software module to perform operations of various embodiments, and the converse is true.

The module or program module according to various embodiments of the present disclosure may include at least one of the above-mentioned elements, omit some of them, or further include other elements. The module, the program module, or the operations performed by other elements according to various embodiments of the present disclosure may be performed in a sequential, parallel, iterative, or heuristic method. Further, some operations may be executed in another sequence or may be omitted, or other operations may be added.

The electronic device according to various embodiments of the present disclosure can adjust a resonance frequency of a coupled feeding antenna including a capacity element between an antenna radiator and a feeder of the electronic device by changing a capacitance of the capacitive element.

Further, the electronic device according to various embodiments of the present disclosure can secure an isolation between a first antenna and a second antenna by spacing ground parts of the first antenna and the second antenna apart from each other.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device comprising:
   a display;
   a housing at least partially accommodating the display and forming a side portion and a rear portion of the portable communication device, a part of the side portion being composed of a conductive member including a first portion, a second portion, a third portion, and a fourth portion, wherein the second portion and the third portion are positioned between the first portion and the fourth portion and electrically connected to ground, and wherein the second portion is extended to a first area of the rear portion and the third portion is extended to a second area of the rear portion;
   a conductive component located between the second portion and the third portion;
   a first feeding member electrically connected to the first portion; and
   a second feeding member electrically connected to the fourth portion,
   wherein the first portion and the second portion are configured to form a first electrical length for communication in a first frequency band, and
   wherein the third portion and the fourth portion are configured to form a second electrical length for communication in a second frequency band.

2. The portable communication device of claim 1,
   wherein the second portion comprises a first part substantially vertical to the rear portion and a second part substantially vertical to the side portion, and
   wherein the electrical connection to ground is not in contact with the first part and is in contact with the second part.

3. The portable communication device of claim 2,
   wherein the third portion comprises a third part substantially vertical to the rear portion and a fourth part substantially vertical to the side portion, and
   wherein the electrical connection to ground is not in contact with the third part and is in contact with the fourth part.

4. The portable communication device of claim 1, further comprising another conductive member forming another part of the side portion, the other conductive member being adjacent to a first ending portion of the conductive member or a second ending portion of the conductive member and electrically connected to ground.

5. The portable communication device of claim 1, further comprising:
   a second conductive member and a third conductive member,
   wherein the second conductive member is adjacent to a first ending portion of the conductive member and forms a second part of the side portion,
   wherein the third conductive member is adjacent to a second ending portion of the conductive member and forms a third part of the side portion, and
   wherein the second conductive member is electrically connected to ground.

6. The portable communication device of claim 5, further comprising:
   a first slit disposed between the second conductive member and the first ending portion; and
   a second slit disposed between the third conductive member and the second ending portion.

7. The portable communication device of claim 6, wherein each of the first slit and the second slit is composed of a non-conductive material.

8. The portable communication device of claim 1,
   wherein the rear portion comprises a non-conductive part and a conductive part, and
   wherein each of the first portion and the second portion is extended to the non-conductive part and is not in contact with the conductive part.

9. A portable communication device comprising:
   a first feeding member;
   a second feeding member;
   a conductive member forming a part of a side portion of the portable communication device, the conductive member including a first portion, a second portion, a third portion, and a fourth portion, the first portion adapted to receive a first signal from the first feeding member and the fourth portion adapted to receive a second signal from the second feeding member, wherein the second portion and the third portion are positioned between the first portion and the fourth portion and electrically connected to ground, and wherein the second portion is extended to a first area of a rear portion of the portable communication device and the third portion is extended to a second area of the rear portion; and
   a conductive component accommodated between the second portion and the third portion and adapted to perform a specified function of the portable communication device,
   wherein at least one portion of the conductive member including the first portion and the second portion is configured to form a first electrical length for communication in a first frequency band, and
   wherein at least another portion of the conductive member including the third portion and the fourth portion is configured to form a second electrical length for communication in a second frequency band.

10. The portable communication device of claim 9, wherein the conductive component comprises a universal serial bus port, an earphone jack or a camera module.

11. The portable communication device of claim 9, further comprising:
- a second conductive member and a third conductive member,
- wherein the second conductive member is adjacent to a first ending portion of the conductive member and forms a second part of the side portion,
- wherein the third conductive member is adjacent to a second ending portion of the conductive member and forms a third part of the side portion, and
- wherein the second conductive member is electrically connected to ground.

12. The portable communication device of claim 11, further comprising:
- a first slit disposed between the second conductive member and the first ending portion; and
- a second slit disposed between the third conductive member and the second ending portion.

13. The portable communication device of claim 9, wherein the first frequency band and the second frequency band are to be isolated from each other by the second portion or the third portion.

14. The portable communication device of claim 9, wherein each of the first frequency band and the second frequency band is a same frequency band.

* * * * *